US 8,075,126 B2

(12) United States Patent
Yoshizawa et al.

(10) Patent No.: US 8,075,126 B2
(45) Date of Patent: Dec. 13, 2011

(54) INK, INK JET RECORDING METHOD, RECORDING UNIT, INK CARTRIDGE, AND INK JET RECORDING APPARATUS

(75) Inventors: Jun Yoshizawa, Tokyo (JP); Shin-ichi Sato, Kawasaki (JP); Kunihiko Nakamura, Gotenba (JP); Tomohiro Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/507,923

(22) Filed: Jul. 23, 2009

(65) Prior Publication Data
US 2009/0295886 A1 Dec. 3, 2009

Related U.S. Application Data

(63) Continuation of application No. 11/320,939, filed on Dec. 30, 2005, now abandoned, which is a continuation of application No. PCT/JP2005/012701, filed on Jul. 4, 2005.

(30) Foreign Application Priority Data

| Jul. 2, 2004 | (JP) | 2004-196446 |
| Jul. 2, 2004 | (JP) | 2004-196449 |
| Jul. 1, 2005 | (JP) | 2005-193806 |

(51) Int. Cl.
*C09D 11/00* (2006.01)
(52) U.S. Cl. .................... 347/100; 106/31.13
(58) Field of Classification Search .......... 347/100; 106/31.13
See application file for complete search history.

(56) References Cited

U.S. PATENT DOCUMENTS

| 4,202,870 A | 5/1980 | Weber et al. | 423/630 |
| 4,242,271 A | 12/1980 | Weber et al. | 260/448 AD |
| 4,248,852 A | 2/1981 | Wakabayashi et al. | 423/626 |
| 4,723,129 A | 2/1988 | Endo et al. | 346/1.1 |
| 4,740,796 A | 4/1988 | Endo et al. | 346/1.1 |
| 5,091,009 A | 2/1992 | Nogami et al. | 106/287.1 |
| 5,221,497 A | 6/1993 | Watanabe et al. | 252/313.2 |
| 5,268,459 A | 12/1993 | Gregory et al. | 534/758 |
| 5,374,301 A | 12/1994 | Gregory et al. | 106/22 K |

(Continued)

FOREIGN PATENT DOCUMENTS

CN 1151423 A 6/1997

(Continued)

OTHER PUBLICATIONS

Nov. 22, 2005 Japanese Official Action in Japanese Patent Appln. No. 2005-193806 (with translation).

(Continued)

*Primary Examiner* — Laura Martin
(74) *Attorney, Agent, or Firm* — Fitzpatrick, Cella, Harper & Scinto

(57) ABSTRACT

An ink jet ink contains at least a coloring material and a specific water-soluble organic solvent and has both excellent color developability and excellent humidity resistance. The coloring material exhibits a small (9 or less) color difference $\Delta E$ value which is determined by a method including a series of specific steps and is represented as the square root of $(L_1-L_2)^2+(a_1-a_2)^2+(b_1-b_2)^2$. The specific water-soluble organic solvent has an evaporation rate X smaller than that of water and a moisture absorptivity Y, the values of X and Y satisfying the relation of $Y \leq 2.8X+10$. The content of the specific water-soluble organic solvent is 50 mass % or more of the total amount of water-soluble organic solvents contained in the ink.

11 Claims, 7 Drawing Sheets

U.S. PATENT DOCUMENTS

| | | | |
|---|---|---|---|
| 5,395,434 A | 3/1995 | Tochihara et al. | 106/22 R |
| 5,415,686 A | 5/1995 | Kurabayashi et al. | 106/26 R |
| 5,451,251 A | 9/1995 | Mafune et al. | 106/22 H |
| 5,482,545 A | 1/1996 | Aoki et al. | 106/22 K |
| 5,485,188 A | 1/1996 | Tochihara et al. | 347/100 |
| 5,749,951 A | 5/1998 | Yoshiike et al. | 106/31.27 |
| 5,835,116 A | 11/1998 | Sato et al. | 347/98 |
| 5,933,164 A | 8/1999 | Sato et al. | 347/43 |
| 5,993,527 A * | 11/1999 | Tochihara et al. | 106/31.85 |
| 6,003,987 A | 12/1999 | Yamamoto et al. | 347/100 |
| 6,027,210 A | 2/2000 | Kurabayashi et al. | 347/100 |
| 6,186,615 B1 | 2/2001 | Sato et al. | 347/43 |
| 6,238,045 B1 | 5/2001 | Ono et al. | 347/96 |
| 6,322,209 B1 | 11/2001 | Sato et al. | 347/105 |
| 6,464,768 B1 * | 10/2002 | Bauer et al. | 106/31.52 |
| 6,511,534 B1 | 1/2003 | Mishina et al. | 106/31.33 |
| 6,698,876 B2 | 3/2004 | Sato et al. | 347/100 |
| 6,976,755 B2 | 12/2005 | Sato et al. | 347/100 |
| 7,056,374 B2 | 6/2006 | Kitayama et al. | 106/31.46 |
| 7,144,452 B2 | 12/2006 | Takayama et al. | 106/31.52 |
| 7,160,372 B2 | 1/2007 | Yoshizawa et al. | 106/31.47 |
| 2003/0071883 A1 * | 4/2003 | Suzuki et al. | 347/100 |
| 2004/0099180 A1 | 5/2004 | Kitayama et al. | 106/31.46 |
| 2005/0005818 A1 | 1/2005 | Sato et al. | 106/31.27 |
| 2005/0006659 A1 | 1/2005 | Ng et al. | 257/99 |
| 2005/0131104 A1 | 6/2005 | Aikawa et al. | 523/160 |
| 2006/0102046 A1 | 5/2006 | Okamura et al. | 106/31.47 |
| 2006/0102048 A1 | 5/2006 | Nakamura et al. | 106/31.52 |
| 2006/0103706 A1 | 5/2006 | Aikawa et al. | 347/100 |
| 2006/0109324 A1 | 5/2006 | Fujimoto et al. | 347/100 |
| 2006/0119683 A1 | 6/2006 | Yoshizawa et al. | 347/100 |
| 2006/0119685 A1 | 6/2006 | Yamashita et al. | 347/100 |
| 2006/0124027 A1 | 6/2006 | Sato | 106/31.6 |
| 2006/0146108 A1 | 7/2006 | Sato et al. | 347/100 |
| 2006/0152569 A1 | 7/2006 | Jinnou et al. | 347/105 |

FOREIGN PATENT DOCUMENTS

| | | |
|---|---|---|
| CN | 1500125 A | 5/2004 |
| EP | 0 738 767 A1 | 10/1996 |
| EP | 1 378 549 A1 | 1/2004 |
| EP | 1 669 413 A1 | 6/2006 |
| JP | 57-44605 B2 | 9/1982 |
| JP | 2-233781 | 9/1990 |
| JP | 4-233975 | 8/1992 |
| JP | 2803134 B2 | 9/1998 |
| JP | 11-29729 | 2/1999 |
| JP | 2881847 B2 | 4/1999 |
| JP | 11-180028 | 7/1999 |
| JP | 11-217529 | 8/1999 |
| JP | 2001-288391 | 10/2001 |
| JP | 2002-285055 | 10/2002 |
| JP | 2003-26967 | 1/2003 |
| JP | 2003-321627 | 11/2003 |
| JP | 2004-83697 | 3/2004 |
| JP | 3833235 B2 | 10/2006 |
| WO | WO 2005/033211 A1 | 4/2005 |

OTHER PUBLICATIONS

Mar. 28, 2006 Japanese Official Action in Japanese Patent Appln. No. 2005-193806 (with translation).

Aug. 7, 2009 Chinese Official Action in Chinese Patent Application No. 2005800223418 (with English-language translation).

* cited by examiner

INK, INK JET RECORDING METHOD, RECORDING UNIT, INK CARTRIDGE, AND INK JET RECORDING APPARATUS

This application is a continuation of application Ser. No. 11/320,939 filed Dec. 30, 2005, which is a continuation of International Application No. PCT/JP2005/012701 filed Jul. 4, 2005, which claims the benefit of Japanese Patent Application Nos. 2004-196446 filed Jul. 2, 2004, 2004-196449 filed Jul. 2, 2004, and 2005-193806 filed Jul. 1, 2005.

BACKGROUND OF THE INVENTION

1. Field of the Invention

The present invention relates to an ink jet ink having good color developability, good humidity resistance, and high reliability as ink jet ink; an ink jet recording method; a recording unit; an ink cartridge; and an ink jet recording apparatus.

2. Related Background Art

An ink jet recording method is a recording method involving applying a small ink droplet to any one of recording media such as plain paper and glossy media to form an image, and has become rapidly widespread owing to a reduction in its cost and an improvement in its recording rate. With the rapid spread of a digital camera in addition to an improvement in quality of an image recorded by the method, the method has been generally used as a method of outputting a photographic image comparable to silver halide photograph.

In recent years, image quality has undergone improvement more than ever owing to, for example, extreme reduction in size of an ink droplet and an improvement of the color gamut involved in the introduction of multi-color ink. Meanwhile, there have been growing demands for a coloring material and ink, and stricter properties have been required in terms of an improvement of color developability and reliability such as sticking property or ejection stability.

As compared to silver halide photography, the ink jet recording method is problematic in terms of, for example, the image storage stability of the resultant recorded article. In general, the recorded article obtained by means of the ink jet recording method is inferior in image storage stability to a silver halide photograph, and involves a problem in that a coloring material on the recorded article is apt to deteriorate to cause a change in color tone of an image and color fading of the image when the recorded article is exposed to light, humidity, heat, an environmental gas present in the air, or the like for a long period of time. To solve the problem, a large number of proposals have been conventionally made.

In general, the ink jet recording method involves the use of inks each having a hue of yellow, magenta, cyan, black, or the like. It has been heretofore acknowledged that the yellow ink out of the inks must be improved in light resistance, water resistance, humidity resistance, and the like. For improving these properties, there has been proposed, for example, the use of a coloring material having a specific structure such as C.I. Direct Yellow 173 or C.I. Direct Yellow 86 (see, for example, Japanese Patent Application Laid-open No. H02-233781 and Japanese Patent Application Laid-open No. H04-233975). The use of such coloring material as mentioned above shows significant improvements in light resistance, water resistance, and humidity resistance, but color tone, color developability, reliability, and the like are not at sufficient levels.

There has also been proposed the use of C.I. Direct Yellow 132 as any one of a yellow ink and a coloring material for an ink set (see, for example, Japanese Patent Application Laid-open No. H11-29729 and Japanese Patent Application Laid-open No. 2001-288391). Although the coloring material has often been used for ink jet ink because of its good color developability, the coloring material involves a problem in that its humidity resistance is remarkably bad.

There have also been proposed the use of a coloring material having a specific structure to aim at improving humidity resistance (see, for example, Japanese Patent Application No. H11-217529) and the use of an ink set of multiple colors to improve humidity resistance (see, for example, Japanese Patent Application Laid-open No. H11-180028).

Each of the proposals described above has attempted to improve humidity resistance, but merely depends on the structure of a coloring material. In other words, neither the proposal for improving humidity resistance by means of a coloring material having a specific structure nor the proposal for improving humidity resistance by means of an ink set of multiple colors can prevent migration (image deterioration due to a change in color tone in an environment such as a high-temperature-and-high-humidity environment).

There has also been proposed the synthesis of a novel coloring material having humidity resistance, light resistance, water resistance, and a hue and sharpness suitable for ink jet recording (see, for example, Japanese Patent Application Laid-open No. 2003-321627). However, even when such coloring material is used, a certain ink prescription cannot reach the level of humidity resistance requested in a current ink jet recording method in some cases.

SUMMARY OF THE INVENTION

In view of the foregoing background, the inventors of the present invention have acknowledged that humidity resistance that is the largest concern in a coloring material having a yellow hue must be improved, and that a yellow ink excellent in both color developability and humidity resistance must be prepared.

The inventors of the present invention have found that a coloring material used in a conventional yellow ink for ink jet recording tends to be poor in humidity resistance when the coloring material has good color developability, while the coloring material tends to be poor in color developability when the coloring material has good humidity resistance. Such tendency is also in correlation with the molecular weight of the coloring material. In general, a coloring material having a large molecular weight hardly moves in a recording medium when the coloring material is brought into contact with excessive humidity after the coloring material has been fixed to the recording medium. As a result, humidity resistance can be improved. Meanwhile, the coloring material having a large molecular weight has a structure in which a part not contributing to coloring is relatively large, so coloring efficiency per unit mass reduces. Therefore, when a coloring material having a large molecular weight and good humidity resistance is to be used, color developability must be sacrificed. In other words, compatibility between color developability and humidity resistance in an ink containing a yellow coloring material must be achieved in order to increase the image storage stability of an ink jet recorded article to the level of silver halide photograph or higher.

The inventors of the present invention have made the following investigation for pursuing the mechanism with which a change in color tone of a recorded article due to migration occurs and for preventing the migration itself. To be specific, the inventors have made investigation into a specific ink composition a recorded article obtained from which is found to change its color tone owing to migration. As a result, the inventors have found that the occurrence of migration largely depends on the presence or absence of a specific water-soluble organic solvent. That is, the inventors have confirmed that migration occurs when a water-soluble organic solvent remaining in a recorded article absorbs moisture in the air in a high-temperature-and-high-humidity environment.

The present invention has been made on the basis of the foregoing findings, and the inventors of the present invention have paid attention to an image formed on a recording medium, paid attention to a difference between a component of an ink before the image formation and a water-soluble organic solvent component remaining in the recording medium after the image formation, and pursued the respective properties of a water-soluble organic solvent in the ink. As a result, the inventors of the present invention have found the mechanism with which a change in color tone due to migration occurs from a difference between properties of the water-soluble organic solvent remaining in a recorded article. Then, the inventors have judged that a change in color tone due to migration largely depends on the total amount of a water-soluble organic solvent remaining in a recorded article and the property with which the water-soluble organic solvent substantially contains water molecules. The inventors have made extensive studies about this point, thereby completing the present invention.

As described above, the inventors of the present invention have found that migration is caused by an interaction between the humidity resistance of a coloring material and a water-soluble organic solvent.

Therefore, a major object of the present invention is to provide a novel technique for suppressing a change in color tone due to migration by paying attention to the amount of a water-soluble organic solvent present in a recorded article on the basis of the foregoing finding.

Another object of the present invention is to provide an ink excellent in humidity resistance and properties as an ink jet ink such as start up ejection stability.

Another object of the present invention is to provide an ink excellent in humidity resistance, start up ejection stability, image density, and color tone.

The above objects are achieved by the present invention described below. That is, according to one aspect of the present invention, there is provided an ink jet ink, comprising at least a coloring material and water-soluble organic solvent, characterized in that the ink jet ink satisfies the following conditions (A) and (B):

(A) A color difference $\Delta E$ judged by means of a method of judging properties of a coloring material including the following steps (1) to (3) is 9 or less, (1) A step involving: applying a model ink comprising the coloring material, water, and a water-soluble organic solvent having an evaporation rate X (mass %) smaller than the evaporation rate of water and a moisture absorptivity Y (mass %) which is 20 or more and satisfies a relationship of $Y \geq 2.8X+10$; and applying a clear ink prepared by replacing only the coloring material of the model ink with water in such a manner that the amount of the model ink is smaller than that of the clear ink, (2) A step involving: leaving a recorded article obtained in the step (1) in an environment having a temperature of 25° C. and a humidity of 60% for 48 hours; and subsequently leaving the recorded article in an environment having a temperature of 30° C. and a humidity of 80% for 168 hours, (3) A step of judging the color difference ($\Delta E$) represented by the following expression (1) between the recorded article before the leaving for 168 hours and the recorded article after the leaving for 168 hours, $$\Delta E = \sqrt{(L_1-L_2)^2+(a_1-a_2)^2+(b_1-b_2)^2} \quad (1)$$

(In the expression (1), $L_1$, $a_1$, and $b_1$, represent L, a, and b of an Lab calorimetric system after the leaving for 48 hours and before the leaving for 168 hours, respectively, and $L_2$, $a_2$, and $b_2$ represent L, a, and b of the Lab calorimetric system after the leaving for 168 hours, respectively.)

(B) The content of a water-soluble organic solvent in which the evaporation rate X (mass %) and the moisture absorptivity Y (mass %) satisfy a relationship represented by the following expression (2) in all the water-soluble organic solvents in the ink is 50 mass % or more.

$$Y \leq 2.8X+10 \quad (2)$$

(In the expression (2), X represents an evaporation rate and Y represents a moisture absorptivity.)

According to another aspect of the present invention, there is provided an ink jet recording method, comprising ejecting an ink by ink jet method, characterized in that the ink is the above-described ink jet ink.

According to another aspect of the present invention, there is provided an ink cartridge including an ink storage portion for storing an ink, characterized in that the ink is the above-described ink jet ink.

According to another aspect of the present invention, there is provided a recording unit including an ink storage portion for storing an ink and a recording head for ejecting the ink, characterized in that the ink is the above-described ink jet ink.

According to another aspect of the present invention, there is provided an ink jet recording apparatus including an ink storage portion for storing an ink and a recording head for ejecting the ink, characterized in that the ink is the above-described ink jet ink.

According to the present invention, there can be provided: an ink jet yellow ink which satisfies color developability requested for ink jet ink and has high humidity resistance even when letters are printed by means of the ink on various recording media; and an ink jet recording method, a recording unit, an ink cartridge, and an ink jet recording apparatus each using the ink.

DESCRIPTION OF THE PREFERRED EMBODIMENTS

Figure 1:
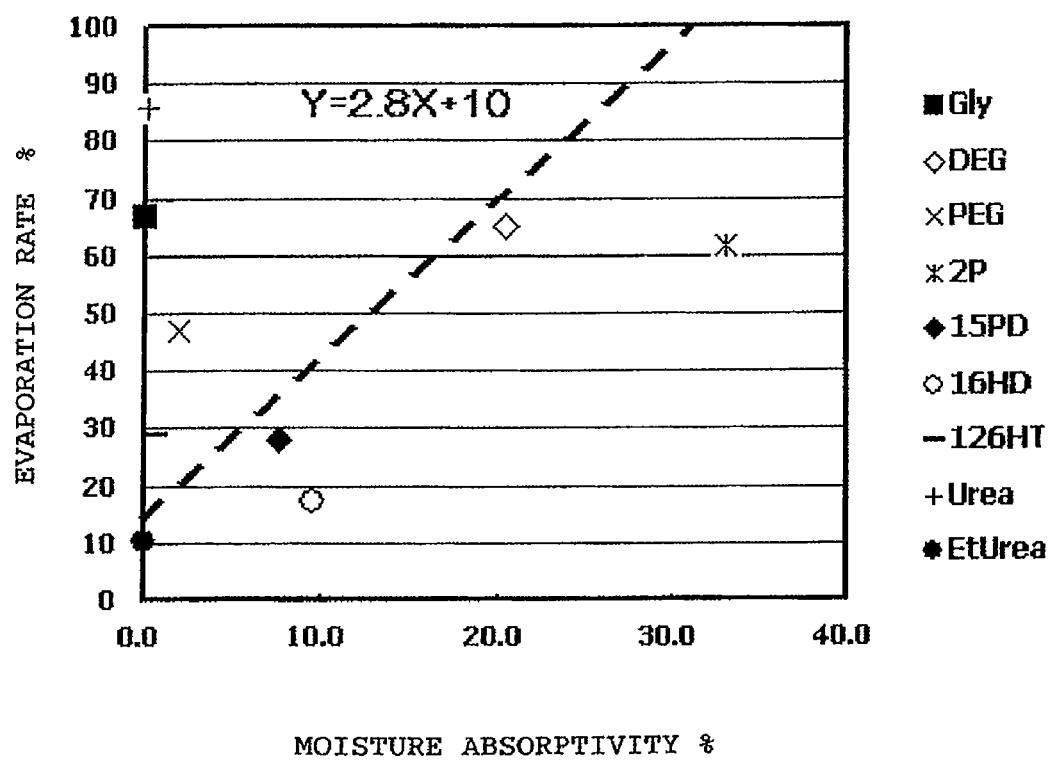
FIG. 1 is a graph showing a relationship between an evaporation rate and a moisture absorptivity in the present invention.

Hereinafter, the present invention will be described in more detail by way of preferred embodiments.

In the present invention, when a compound is a salt, the salt is dissociated to ions in ink, but this state is represented by using the phrase "contains a salt" for convenience.

<Ink>

The inventors of the present invention have revealed that migration results from an interaction between the humidity resistance of a coloring material and a water-soluble organic solvent. Hereinafter, a component constituting the ink according to the present invention and the like will be described in detail.

(Coloring Material)

The ink jet ink according to the present invention (which may hereinafter be simply referred to as the "ink") must contain a coloring material having a color difference (ΔE) judged by means of a method of judging properties of a coloring material to be described later of 9 or less.

[Method of Judging Properties of Coloring Material]

The method of judging properties of a coloring material in the present invention includes the above-described steps (1) to (3). Those steps will be described in more detail by dividing them into the following steps (a) to (g).

(a) Preparation of Model Ink and Clear Ink

Prepared are a model ink containing a coloring material, water, and a water-soluble organic solvent having an evaporation rate X (mass %) smaller than that of water and a moisture absorptivity Y (mass %) which is 20 mass % or more and satisfies a relationship of Y≧2.8X+10, or preferably Y>2.8X+10 (the technical meaning of Y≧2.8X+10 will be described later), and a clear ink prepared by replacing the coloring material in the above composition with water. With the composition, the ink has a condition under which migration tends to occur. It is important for the composition to satisfy the above condition because the composition aims at judging the properties (especially humidity resistance) of a coloring material.

The evaporation rate X (mass %) in the present invention is determined by: placing 5 g of a water-soluble organic solvent into a dish having an outer diameter of 31 mm and a height of 15 mm; leaving the dish to stand still in an environment having a temperature of 60° C. and a humidity of 10% for 192 hours; measuring the mass of the water-soluble organic solvent again; and determining the evaporation rate from the reduced mass of the water-soluble organic solvent. The moisture absorptivity Y (mass %) is determined by: placing 5 g of a water-soluble organic solvent into a dish having an outer diameter of 31 mm and a height of 15 mm; leaving the dish to stand still in an environment having a temperature of 30° C. and a humidity of 80% for 192 hours; measuring the mass of the water-soluble organic solvent again; and determining the moisture absorptivity from the increased mass of the water-soluble organic solvent.

A specific example of the composition of a model ink includes the following composition. A model ink was prepared according to the following composition by using glycerin and urea as water-soluble organic solvents, Acetylenol E-100 (manufactured by Kawaken Fine Chemicals Co., Ltd.) as a surfactant, and C.I. Direct Yellow 132 as a coloring material. Table 1 shows the evaporation rate X (mass %) and moisture absorptivity (mass %) of each of glycerin and urea, and the evaporation rate X (mass %) of water (pure water). Table 1 below shows that each of glycerin and urea corresponds to a water-soluble organic solvent having an evaporation rate smaller than that of water and a moisture absorptivity of 20 mass % or more.

TABLE 1

|  | Composition [mass %] | Evaporation rate [mass %] | Moisture absorptivity [mass %] |
| --- | --- | --- | --- |
| Glycerin | 10.0 | 0.0 | 66.9 |
| Urea | 10.0 | 0.1 | 86.0 |
| Acetylenol E-100 | 1.0 | — | — |
| C.I. Direct Yellow 132 | 3.0 | — | — |
| Pure water | 76.0 | 100.0 | — |

(b) Creation of Image for Evaluation

The model ink and the clear ink thus prepared are superimposed to create an image for evaluation. Although the image may have an arbitrary printing duty, it is important to superimpose the model ink and the clear ink. This is because, in general, printing is seldom performed by means of one kind of ink alone in consideration of the state of a recorded article in an actual environment. In other words, it can be said that migration occurs in a situation where multiple inks are present. Therefore, it is important to create an image for evaluation by superimposing a model ink and a clear ink in order to reproduce the situation. Furthermore, the amount of the model ink to be applied is preferably smaller than that of the clear ink. This is because, when an image for evaluation is created by superimposing a model ink and a clear ink under the above-described condition, the amount of a water-soluble organic solvent to be applied with respect to a coloring material increases on a recording medium, with the result that migration is more likely to occur. This approach enables a difference in property (especially humidity resistance) between coloring materials to be represented with improved clarity, so the properties (especially humidity resistance) of a target coloring material can be judged with improved clarity. In the present invention, the above model ink and the above clear ink were used, and each of them was changed in the duty range of 5 to 100% in an increment of 5% to create an image for evaluation in which the model ink and the clear ink were superimposed.

In the present invention, the evaluation of a coloring material for properties (especially humidity resistance) does not require a specific recording apparatus or recording medium. The shapes of a recording apparatus and a recording medium are not limited as long as the recording apparatus applies ink to the recording medium and the recording medium can receive the ink. A specific example of such recording apparatus includes a recording apparatus including: an ink storage portion for storing ink; and a recording head for ejecting the ink.

(c) Creation of Image for Evaluation in Initial Standard State

The evaporation of each of the water-soluble organic solvent and water present in the image for evaluation thus created is promoted. The image for evaluation is left in an environment having a temperature of $T_1$° C. and a humidity of $H_1$% for a certain period of time to promote the evaporation of each of the water-soluble organic solvent and water present in the image for evaluation. As a result, an image for evaluation in an initial standard state can be created. It is important to reduce the absolute water content of the environment in which the image for evaluation is placed in order to promote the evaporation of each of the water-soluble organic solvent and water in the image for evaluation.

Although it is important to leave the image for evaluation in an initial standard state in the environment having a temperature of $T_1$° C. and a humidity of $H_1$% for a certain period of time, the period may be arbitrary. To be specific, the period is preferably such that the evaporation of each of the water-soluble organic solvent and water from inside the image for evaluation is reduced and the mass of the image for evaluation becomes constant. For example, the inventors have confirmed that the evaporation of each of the water-soluble organic solvent and water from inside the image for evaluation reaches substantial equilibrium in 48 hours and the mass of the image for evaluation becomes constant in an environment having a temperature of $T_1=25°$ C. and a humidity of $H_1=60\%$, the temperature and the humidity being selected by assuming the state of a recorded article in an actual environment.

When the image for evaluation is left for shorter than 48 hours, the evaporation of each of the water-soluble organic solvent and water does not reach equilibrium, and hence the water-soluble organic solvent or water is expected to remain in the image for evaluation. As a result, the initial standard state is not stabilized, and there is a possibility that the state of occurrence of migration changes and the accuracy of judgment of humidity resistance reduces. When the image for evaluation is left for longer than 48 hours, the initial standard state can be stabilized, but the evaporation of each of the water-soluble organic solvent and water from inside the image for evaluation is expected to be additionally promoted. As a result, the amount of a water-soluble organic solvent remaining in the image for evaluation, the water-soluble organic solvent being expected to result in migration, reduces and the amount of a water-soluble organic solvent capable of absorbing moisture reduces. Accordingly, there is a possibility that migration hardly tends to occur.

In view of the foregoing reasons, the image for evaluation is preferably left in the environment having a temperature of $T_1=25°$ C. and a humidity of $H_1=60\%$ for 48 hours. Under the above condition, the evaporation of each of the water-soluble organic solvent and water in keeping with the state of a recorded article in an actual environment is expected to be realized. It should be noted that the absolute water content present in the environment having a temperature of 25° C. and a humidity of 60% is about 13.8 $g/m^3$.

(d) Measurement of Color Tone of Image for Evaluation in Initial Standard State

The color tone (CIE-La*b* values) of the image for evaluation in the initial standard state thus created is measured. This measurement intends to numerically grasp the color tone of the image for evaluation in the initial standard state left for a certain period of time. In the present invention, the color tone of the image for evaluation in the initial standard state was measured by means of a spectrophotometer (trade name: Spectrolino; manufactured by Gretag Macbeth).

(e) Creation of Image for Evaluation after Acceleration Test

The image for evaluation in the initial standard state thus created is left in a (high-temperature-and-high-humidity) environment having a temperature of $T_2°$ C. and a humidity of $H_2\%$ to cause migration to occur at an increasingly fast rate, thereby creating an image for evaluation after an acceleration test. The temperature and the humidity at the time of acceleration are arbitrary, provided that $T_1<T_2$ and $H_1<H_2$. That is, it is important to increase the absolute water content present in the environment by setting a higher temperature and a higher humidity. In general, migration is considered to occur when a water-soluble organic solvent present in a recorded article absorbs moisture. Accordingly, it is important to promote the occurrence of migration by increasing the absolute water content present in the environment in which the image for evaluation is placed. To be specific, the temperature $T_2°$ C. is preferably 30° C. or higher and the humidity $H_2\%$ is preferably 80% or higher because the absolute water content present in the environment in which the image for evaluation is placed can be increased. In the present invention, in view of the conditions of a recording apparatus and a recorded article in an actual environment, the temperature $T_2°$ C. and the humidity $H_2\%$ are set to 30° C. and 80%, respectively. As a result, a condition under which migration may occur in a recorded article when an actual user uses a recording apparatus is reproduced. It should be noted that the absolute water content present in the environment having a temperature of 30° C. and a humidity of 80% is about 24.3 $g/m^3$.

The time period during which the image for evaluation is left in the (high-temperature-and-high-humidity) environment having a temperature of $T_2°$ C. and a humidity of $H_2\%$ is set by chronologically following a change in color tone of the image for evaluation. To be specific, a change in color tone of the image for evaluation from the initial standard state is recorded, and the point at which a rate of change reduces is preferably set to be the time period during which the image for evaluation in the initial standard state is left in the (high-temperature-and-high-humidity) environment having a temperature of $T_2°$ C. and a humidity of $H_2\%$. More preferably, the point at which nearly no change in color tone is observed is set to be an appropriate time period during which the image for evaluation in the initial standard state is left in the (high-temperature-and-high-humidity) environment having a temperature of $T_2°$ C. and a humidity of $H_2\%$. For example, a rate of change in color tone will reduce in an environment having a temperature of $T_2=30°$ C. and a humidity of $H_2=80\%$ in 96 hours, and nearly no change in color tone will be observed in the environment in 168 hours. Therefore, it is important to leave the image for evaluation in the initial standard state in the (high-temperature-and-high-humidity) environment having a temperature of $T_2°$ C. and a humidity of $H_2\%$ for 96 hours or longer in order to evaluate migration. More preferably, the image for evaluation in the initial standard state is left in the (high-temperature-and-high-humidity) environment having a temperature of $T_2°$ C. and a humidity of $H_2\%$ for 168 hours or longer because a change in color tone shows a nearly constant value, so a difference in property (especially humidity resistance) between coloring materials can be judged with improved accuracy. In view of the foregoing reasons, the image for evaluation is preferably left in the environment having a temperature of $T_2=30°$ C. and a humidity of $H_2=80\%$ for 168 hours.

(f) Measurement of Color Tone of Image for Evaluation after Acceleration Test

The color tone (CIE-La*b* values) of the image for evaluation after the acceleration test thus created is measured. This measurement intends to numerically grasp the color tone of the image for evaluation after the acceleration test. To be specific, the color tone of the image for evaluation after the acceleration test was measured by means of a spectrophotometer (trade name: Spectrolino; manufactured by Gretag Macbeth) in the same manner as that of the above (d).

(g) Calculation of Color Difference (ΔE)

The color difference (ΔE) was calculated on the basis of the following expression (1) from the color tone (CIE-La*b* values) of the image for evaluation in the initial standard state measured in the above (d) and the color tone (CIE-La*b* values) of the image for evaluation after the acceleration test measured in the above (f).

Values of La*b* in a CIE-La*b* color space of the image for evaluation in the initial standard state=$(L_1, a_1, b_1)$ Values of La*b* in the CIE-La*b* color space of the image for evaluation after the acceleration test=$(L_2, a_2, b_2)$ $$\Delta E = \sqrt{(L_1-L_2)^2+(a_1-a_2)^2+(b_1-b_2)^2} \qquad (1)$$

The color difference (ΔE) calculated on the basis of expression (1) represents an amount of change in color tone. Therefore, the larger the color difference (ΔE), the larger the change in color tone. In other words, a larger color difference (ΔE) means that migration tends to occur, so the degree of migration can be numerically represented by means of the color difference (ΔE).

In the present invention, the following procedure is essential. Each coloring material is evaluated for properties (especially humidity resistance) by means of the above-described method of judging properties of a coloring material, the color differences (ΔE) ΔE1, ΔE2, . . . in the respective images for evaluation created by means of the respective coloring materials are calculated, and a coloring material having the maximum color difference (ΔE) out of the calculated color differences of 9 or less is used.

(Coloring Material Represented by General Formula (I))

Another embodiment of the present invention is characterized in that the coloring material having a color difference (ΔE) judged by means of the method of judging properties of a coloring material of 9 or less is a compound represented by the following general formula (I) or a salt thereof.

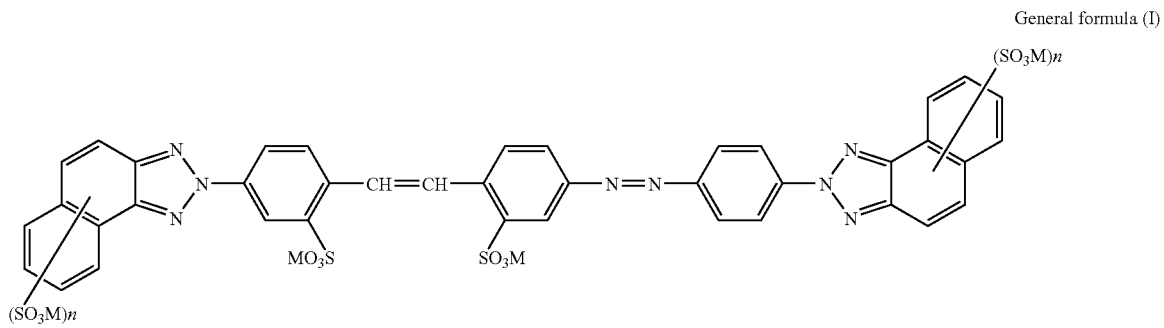

General formula (I)

(In the general formula (I), M's each independently represent a hydrogen atom, an alkali metal, an alkali earth metal, a cation of organic amine or an ammonium ion, and n's each independently represent 1 or 2.)

Specific examples of the coloring material represented by the general formula (I) include compounds having structures shown in Table 2 below. Of course, the present invention is not limited to them. In Table 1, for convenience, the substitution position of a sulfone group is represented by means of an A ring or a B ring as shown in the following general formula (II). The substitution position of a sulfone group is as defined in the following general formula (II).

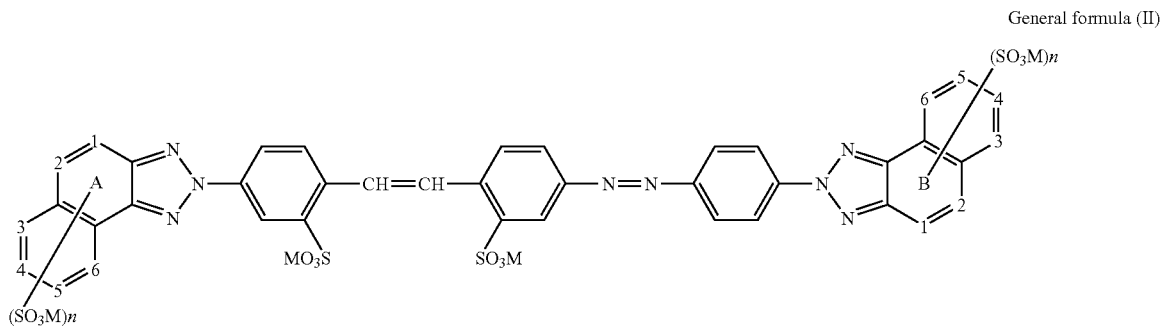

General formula (II)

(In the general formula (II), M's each independently represent a hydrogen atom, an alkali metal, an alkali earth metal, a cation of organic amine or an ammonium ion, and n's each independently represent 1 or 2.)

TABLE 2

|  |  | Position of substituent | |
|---|---|---|---|
|  |  | A ring | B ring |
| Exemplified Compound | 1 | 2 | 4 |
|  | 2 | 4 | 4 |
|  | 3 | 2 | 4, 6 |
|  | 4 | 4, 6 | 4 |

A preferable specific example of the coloring material represented by the general formula (I) includes Exemplified Compound 1 below. Of course, the present invention is not limited to it.

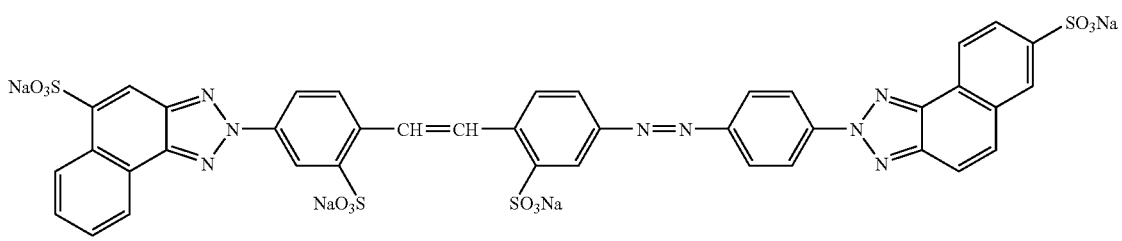

Exemplified Compount 1

[Coloring Material Except Coloring Material Represented by General Formula (I)]

In the present invention, two or more kinds of coloring materials are preferably used for additionally increasing an image density, for obtaining a more preferable color tone, and for other purposes. The coloring material represented by the general formula (I) and C.I. Direct Yellow 132 are particularly preferable as such coloring materials. Accordingly, another embodiment of the present invention is characterized in that C.I. Direct Yellow 132 is incorporated as a coloring material in addition to the coloring material represented by the general formula (I).

[Content of Coloring Material]

The content of a coloring material in the ink jet ink according to the present invention is preferably 1.0 mass % or more and 4.0 mass % or less with respect to the total mass of the ink. When the content of a coloring material is smaller than 1.0 mass %, effects of the present invention such as color developability and humidity resistance cannot be sufficiently obtained in some cases. When the content of a coloring material exceeds 4.0 mass %, reliability such as start up ejection stability and other ink jet properties may reduce.

In addition, the content of the coloring material represented by the general formula (I) is preferably 10 mass % or more with respect to the total content of all the coloring materials in the ink in order to sufficiently obtain the effects of the present invention. When C.I. Direct Yellow 132 is used in combination, its content is preferably 10 mass % or more with respect to the total content of the coloring materials in the ink. Furthermore, a ratio of the content of the coloring material represented by the general formula (I) to the content of C.I. Direct Yellow 132 (the content of the coloring material represented by the general formula (I): the content of C.I. Direct Yellow 132) is in the range of 0.5:5 to 2:5 in mass ratio. An excessively small content of the coloring material represented by the general formula (I) makes it difficult to obtain a significant effect of the present invention, while an excessively large content of the coloring material tends to reduce an image density.

[Method of Testing Coloring Material]

Exemplified Compound 1, which is an example of the coloring material to be used in the present invention, can be tested by the following methods (1) to (3) each of which involves the use of high performance liquid chromatography (HPLC).

(1) Retention time of the peak
(2) Maximum absorption wavelength in the peak of (1)
(3) M/Z (posi, nega) of mass spectrum in the peak of (1)

Analysis conditions for high performance liquid chromatography are as shown below. An ink solution diluted 1,000 times with pure water is analyzed by means of high performance liquid chromatography under the following conditions to measure the retention time of a main peak and the maximum absorption wavelength of a peak.

Column: Symmetry C18 2.1 mm×150 mm
Column temperature: 40° C.
Flow rate: 0.2 ml/min
PDA: 210 nm to 700 nm
Mobile phase and gradient condition: Table 3

TABLE 3

|  | 0-5 min | 5-40 min | 40-45 min |
|---|---|---|---|
| A Water | 85% | 85% > 0% | 0% |
| B Methanol | 10% | 10% > 95% | 95% |
| C 0.2-mol/l aqueous solution of ammonium acetate | 5% | 5% | 5% |

In addition, analysis conditions for a mass spectrum are as shown below. The mass spectrum of the resultant peak is measured under the following conditions, and the most strongly detected M/Z is measured for each of posi and nega.

| Ionization method | | |
|---|---|---|
| ESI | Capillary voltage | 3.5 kV |
|  | Desolvating gas | 300° C. |
|  | Ion source temperature | 120° C. |
| Detector | posi 40 V 200-1,500 amu/0.9 sec | |
|  | nega 40 V 200-1,500 amu/0.9 sec | |

Table 4 shows the values of the retention time, maximum absorption wavelength, M/Z (posi), and M/Z (nega) of each of Exemplified Compound 1 and C.I. Direct Yellow 132. When a coloring material has a value shown in Table 4, the coloring material can be judged to be a coloring material used in the present invention.

TABLE 4

| | Retention time [min] | Maximum absorption wavelength [nm] | M/Z Posi | M/Z Nega |
|---|---|---|---|---|
| Exemplified Compound 1 | 31-32 | 390-410 | 938-939 | 468-469 |
| C.I. Direct Yellow 132 | 33-34 | 390-410 | 640-641 | 319-320 |

(Water-soluble Organic Solvent)

Water-soluble organic solvents to be used in the ink of the present invention must be such that the content of a water-soluble organic solvent in which the evaporation rate X (mass %) and the moisture absorptivity Y (mass %) satisfy the relationship represented by the following expression (2) with respect to the total content of the water-soluble organic solvents in the ink is 50 mass % or more.

Migration is considered to occur when a water-soluble organic solvent present in a recorded article absorbs moisture. Therefore, migration can be suppressed by incorporating a certain amount or more of a water-soluble organic solvent which readily evaporates and has a low moisture absorptivity into ink. However, ink containing only a water-soluble organic solvent which readily evaporates and has a low moisture absorptivity tends to be problematic in terms of adhesion at the tip of a nozzle, start up ejection stability, and the like. In the present invention, ink with suppressed migration, suppressed adhesion at the tip of a nozzle, and, for example, excellent start up ejection stability can be obtained when a water-soluble organic solvent satisfies the above constitution.

$$Y \leq 2.8X + 10 \quad (2)$$

(In the expression (2), X represents an evaporation rate and Y represents a moisture absorptivity.)

The evaporation rate X (mass %) in the present invention is determined by: placing 5 g of a water-soluble organic solvent into a dish having an outer diameter of 31 mm and a height of 15 mm; leaving the dish to stand still in an environment having a temperature of 60° C. and a humidity of 10% for 192 hours; measuring the mass of the water-soluble organic solvent again; and determining the evaporation rate from the reduced mass of the water-soluble organic solvent. The moisture absorptivity Y (mass %) is determined by: placing 5 g of a water-soluble organic solvent into a dish having an outer diameter of 31 mm and a height of 15 mm; leaving the dish to stand still in an environment having a temperature of 30° C. and a humidity of 80% for 192 hours; measuring the mass of the water-soluble organic solvent again; and determining the moisture absorptivity from the increased mass of the water-soluble organic solvent. FIG. 1 is a graph showing a relationship between the evaporation rate and moisture absorptivity of each water-soluble organic solvent calculated by means of the above method. In the figure, Gly, DEG, PEG, 2P, 15PD, 16HD, 126HT, Urea, and EtUrea represent glycerin, diethylene glycol, polyethylene glycol, 2-pyrrolidone, 1,5-pentanediol, 1,6-hexanediol, 1,2,6-hexanetriol, urea, and ethylene urea, respectively.

Ink containing each of the above respective water-soluble organic solvents was prepared, and the following experiment was performed. A model ink was prepared, which contained 3 mass % of C.I. Direct Yellow 132, 20 mass % of each water-soluble organic solvent, and 0.5 mass % of Acetylenol E-100 (manufactured by Kawaken Fine Chemicals Co., Ltd.) as a surfactant, the balance being water. Separately from the model ink, a clear ink was prepared by replacing the coloring material with water. Each of the resultant model ink and the resultant clear ink was changed in the duty range of 0 to 100% to create a recorded article having formed thereon an image in which the model ink and the clear ink were superimposed. A PIXUS 950i (manufactured by CANON Inc.) as an ink jet printer and a super photo paper (SP-101; manufactured by CANON Inc.) as a recording medium were used for creating the recorded article.

The resultant recorded article was left in a (normal-temperature-and-normal-humidity) environment having a temperature of 25° C. and a humidity of 60% for 48 hours to cause the water-soluble organic solvent and water to evaporate from the recording medium. The color tone (CIE-La*b* values) after the leaving in the environment having a temperature of 25° C. and a humidity of 60% for 48 hours was measured by means of a spectrophotometer (trade name: Spectrorino; manufactured by Gretag Macbeth) to determine the values of La*b*. After that, the resultant recorded article was left in a (high-temperature-and-high-humidity) environment having a temperature of 30° C. and a humidity of 80% for 168 hours to cause the water-soluble organic solvent to migrate. The color tone (CIE-La*b* values) after the leaving in the environment having a temperature of 30° C. and a humidity of 80% for 168 hours was measured by means of the same spectrophotometer as that described above to determine the values of La*b* after the migration of the water-soluble organic solvent. The maximum color difference ($\Delta E$) was determined from the obtained results. It can be said that the larger the color difference ($\Delta E$), the larger a change in color tone in a high-temperature-and-high-humidity environment and the lower the humidity resistance.

The above experimental results, and the relationship between the evaporation rate and moisture absorptivity of each water-soluble organic solvent showed that there is a correlation between the evaporation rate and the moisture absorptivity.

Migration refers to image deterioration due to a change in color tone in, for example, a high-temperature-and-high-humidity environment. Therefore, the lower the color difference caused by an environment, the better the migration property of the water-soluble organic solvent. A water-soluble organic solvent having good migration property, that is, good humidity resistance has a characteristic in that the solvent readily evaporates and hardly absorbs moisture. In other words, a water-soluble organic solvent having better migration property shows a smaller color difference ($\Delta E$).

$\Delta E \leq 5.5$ $\Delta E > 5.5$

In general, an image having a color difference ($\Delta E$) of 5.5 or less is preferable because no change in color tone due to migration occurs even in a high-temperature-and-high-humidity environment. In contrast, an image having a color difference ($\Delta E$) of larger than 5.5 shows a remarkable change in color tone due to migration in a high-temperature-and-high-humidity environment, to thereby deteriorate. The expression (2) is obtained by finding the relationship among the migration of each water-soluble organic solvent, and the evaporation rate and moisture absorptivity of the solvent on the basis of the above criterion. That is, in FIG. 1, a water-soluble organic solvent on the right side with respect to the line of $Y = 2.8X + 10$ has a color difference ($\Delta E$) of 5.5 or less.

In general, a water-soluble organic solvent (poor solvent) having low solubility for a coloring material can also be used for improving humidity resistance. However, none of the coloring materials to be used in the present invention showed a relationship between migration and the solubility of the coloring material in a water-soluble organic solvent. That is, not the solubility of a coloring material to be used in the present invention in a water-soluble organic solvent but the evaporation rate and moisture absorptivity of a water-soluble organic solvent in ink hold a dominant position in the improvement of the humidity resistance of the coloring material to be used in the present invention.

Specific examples of the water-soluble organic solvent satisfying the relationship represented by the expression (2) include ethylene glycol, diethylene glycol, 2-pyrrolidone, 1,5-pentanediol, 1,6-hexanediol, ethylene urea, N-methyl-2-pyrrolidone, butyl carbitol, and isopropyl alcohol. Of those, ethylene glycol, diethylene glycol, 2-pyrrolidone, 1,5-pentanediol, 1,6-hexanediol, and ethylene urea are preferable, and ethylene urea is particularly preferable. Ethylene urea, diethylene glycol, and 2-pyrrolidone are particularly preferably used in combination for improving ink jet properties such as reliability. Any water-soluble organic solvent other than those described above may be used as long as the solvent satisfies the relationship represented by the expression (2).

In the ink according to the present invention, a water-soluble organic solvent that does not satisfy the relationship represented by the expression (2) such as glycerin, urea, or polyethylene glycol can be used to the extent that the addition of such water-soluble organic solvent has an effect, and the objects and effects of the present invention are not impaired. However, the content of a water-soluble organic solvent satisfying the relationship represented by the expression (2) with respect to the total content of the water-soluble organic solvents in the ink must be 50 mass % or more in order to sufficiently obtain the effects of the present invention. The content of a water-soluble organic solvent satisfying the relationship represented by the expression (2) with respect to the total content of the water-soluble organic solvents in the ink is preferably 65 mass % or more because the effects of the present invention are efficiently exerted.

In the present invention, the content of a water-soluble organic solvent satisfying the relationship represented by the expression (2) with respect to the total mass of all the water-soluble organic solvents in the ink is 50 mass % or more. When the content of a water-soluble organic solvent satisfying the relationship represented by the expression (2) is excessively small, a significant effect of the present invention cannot be obtained.

Meanwhile, the total content of all the water-soluble organic solvents in the ink is preferably 10 mass % or more and 50 mass % or less with respect to the total mass of the ink. When the total content of the water-soluble organic solvents is smaller than 10 mass % or exceeds 50 mass %, ink jet properties such as reliability may deteriorate.

(Other Additive)

The ink of the present invention may use moisture-retaining solid contents such as urea and a urea derivative as ink components as required.

In addition, the ink of the present invention may be added with various additives such as a surfactant, a pH adjustor, a rust inhibitor, an antiseptic, an antifungus agent, an antioxidant, a reduction inhibitor, an evaporation accelerator, a chelating agent, and a water-soluble polymer.

<Recording Medium>

Any recording medium can be used for forming an image by means of the ink of the present invention as long as recording is performed by applying the ink to the recording medium. The present invention is applicable to a recording medium in which a coloring material such as a pigment is adsorbed to a fine particle forming a porous structure in an ink-receiving layer and an image is formed from at least the fine particle having adsorbed thereto the coloring material, and the present invention is particularly suitable for the case where an ink jet method is used. Such ink jet recording medium is preferably of a so-called absorption type in which ink is absorbed by a gap formed in an ink-receiving layer on a support.

An absorption type ink-receiving layer is constituted as a porous layer mainly composed of a fine particle and containing a binder and any other additive as required. Specific examples of the fine particle include: inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them are used. Examples of a binder that is suitably used include a water-soluble polymer and a latex. Examples of an available binder include: polyvinyl alcohol or a denatured product thereof; starch or a denatured product thereof; gelatin or a denatured product thereof; gum arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional group-denatured polymer latex, and an ethylene-vinyl acetate copolymer; polyvinyl pyrrolidone; maleic anhydride or a copolymer thereof; and an acrylate copolymer. Two or more kinds of them can be used in combination as required. In addition, an additive may be used, and examples of an additive to be used as required include a dispersant, a thickener, a pH adjustor, a lubricant, a fluidity denaturing agent, a surfactant, a defoaming agent, a releasing agent, a fluorescent bleach, a UV absorber, and an antioxidant.

In particular, a recording medium having formed thereon an ink-receiving layer mainly composed of fine particles having an average particle size of 1 μm or less is preferably used in the present invention. Particularly preferable examples of the fine particles include silica fine particles and aluminum oxide fine particles. Preferable silica fine particles are silica fine particles typified by colloidal silica. Colloidal silica, which itself is available from the market, is particularly preferably that described in JP 2803134 B or JP 2881847B. Preferable aluminum oxide fine particles are alumina hydrate fine particles and the like. An alumina hydrate represented by the following general formula can be exemplified as one example of such alumina hydrate fine particles.

$$AlO_{3-n}(OH)_{2n} \cdot mH_2O$$

(In the formula, n represents an integer of 1, 2, or 3, and m represents a value of 0 to 10, or preferably 0 to 5; provided, however, that m and n cannot be simultaneously 0. m may be or may not be an integer because $mH_2O$ also represents an aqueous phase that can desorb and is not involved in the formation of an $mH_2O$ crystal lattice in many cases. In addition, heating such kind of material may cause m to reach 0.)

An alumina hydrate can be produced by means of a conventionally known method such as: the hydrolysis of aluminum alkoxide or sodium aluminate described in U.S. Pat. No. 4,242,271 or U.S. Pat. No. 4,202,870; or a method involving adding an aqueous solution of sodium sulfate, aluminum chloride, or the like to an aqueous solution of sodium aluminate or the like to perform neutralization described in JP-B57-44605.

The recording medium preferably has a support for supporting the above-described ink-receiving layer. Any support can be use without any particular limitation as long as its ink-receiving layer can be formed of the above-described porous fine particles and the support provides rigidity such that the ink-receiving layer can be conveyed by a conveying mechanism of an ink jet printer or the like. Specific examples thereof include: a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer added with a white pigment or the like.

<Ink Set>

The ink of the present invention can also be preferably used even when the ink is combined with any other ink to provide an ink set. The ink set in the present invention refers to a state where the ink of the present invention is used in combination with another ink such as cyan ink, magenta ink, yellow ink, or black ink. The other ink that can be combined to provide an ink set is not limited. The ink set in the present invention also includes the case where multiple ink tanks are combined and used as well as an ink tank itself having multiple ink tanks integrated with each other. The ink set further includes an integrated product of the ink tank and a recording head.

<Ink Jet Recording Method>

The ink according to the present invention is particularly suitably used for an ink jet recording method including the step of ejecting the ink by means of an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by means of the ink according to the present invention includes an ink cartridge including an ink storage portion for storing the ink.

<Recording Unit>

An example of a recording unit suitable for performing recording by means of the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

<Ink Jet Recording Apparatus>

An example of a recording apparatus suitable for performing recording by means of the ink according to the present invention includes a recording apparatus in which thermal energy corresponding to a recording signal is applied to ink in the chamber of a recording head having an ink storage portion for storing the ink to generate an ink droplet by virtue of the energy.

Hereinafter, the schematic constitution of a mechanism portion of an ink jet recording apparatus will be described. A recording apparatus main body is constituted by a sheet feeding portion, a sheet conveying portion, a carriage portion, a sheet discharge portion, and a cleaning portion, and an external packaging portion for protecting them and providing them with design to achieve a role of each mechanism. Hereinafter, the outline of each of them will be described.

Figure 2:
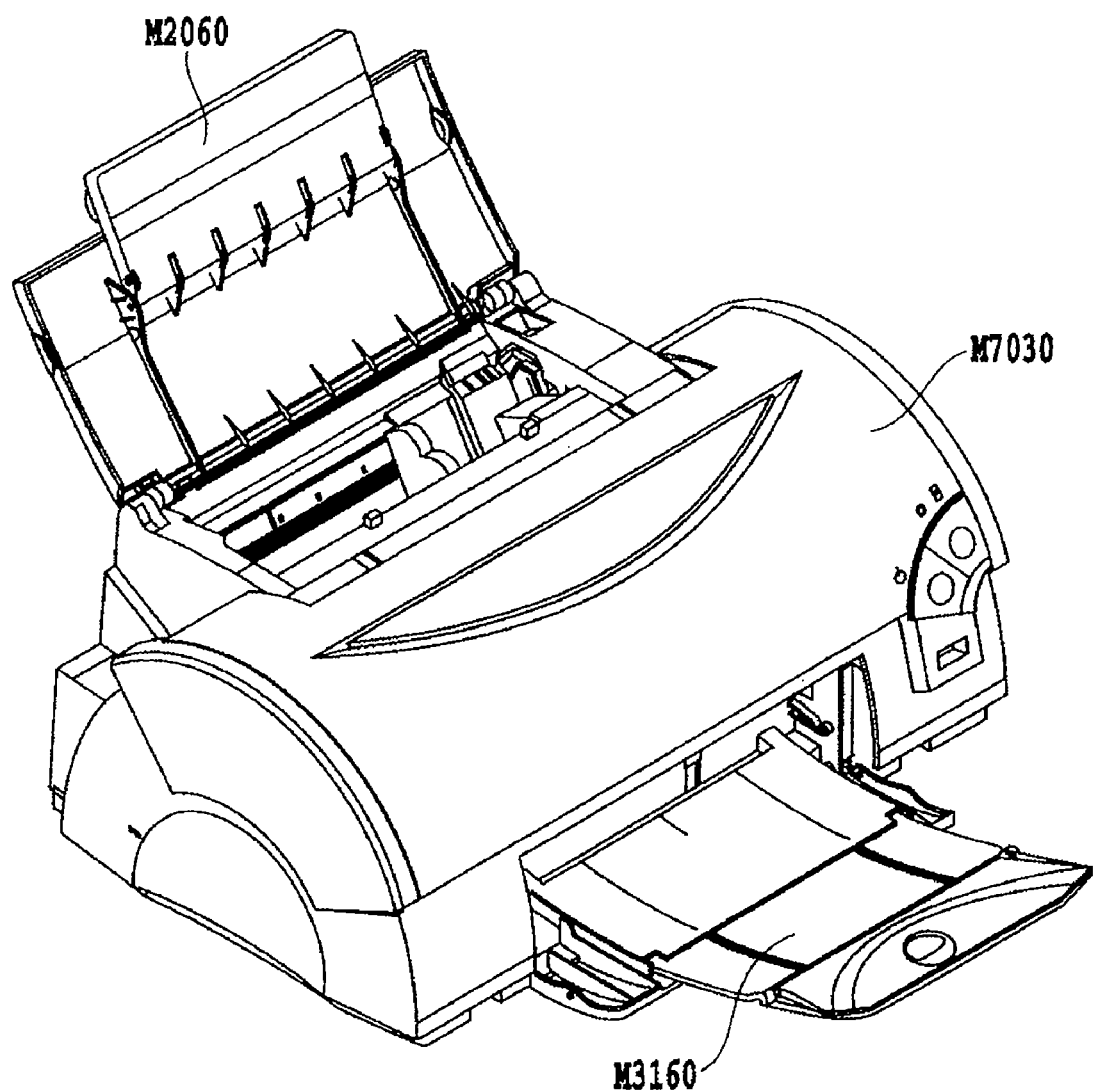
FIG. 2 is a perspective view of a recording apparatus.
Figure 3:
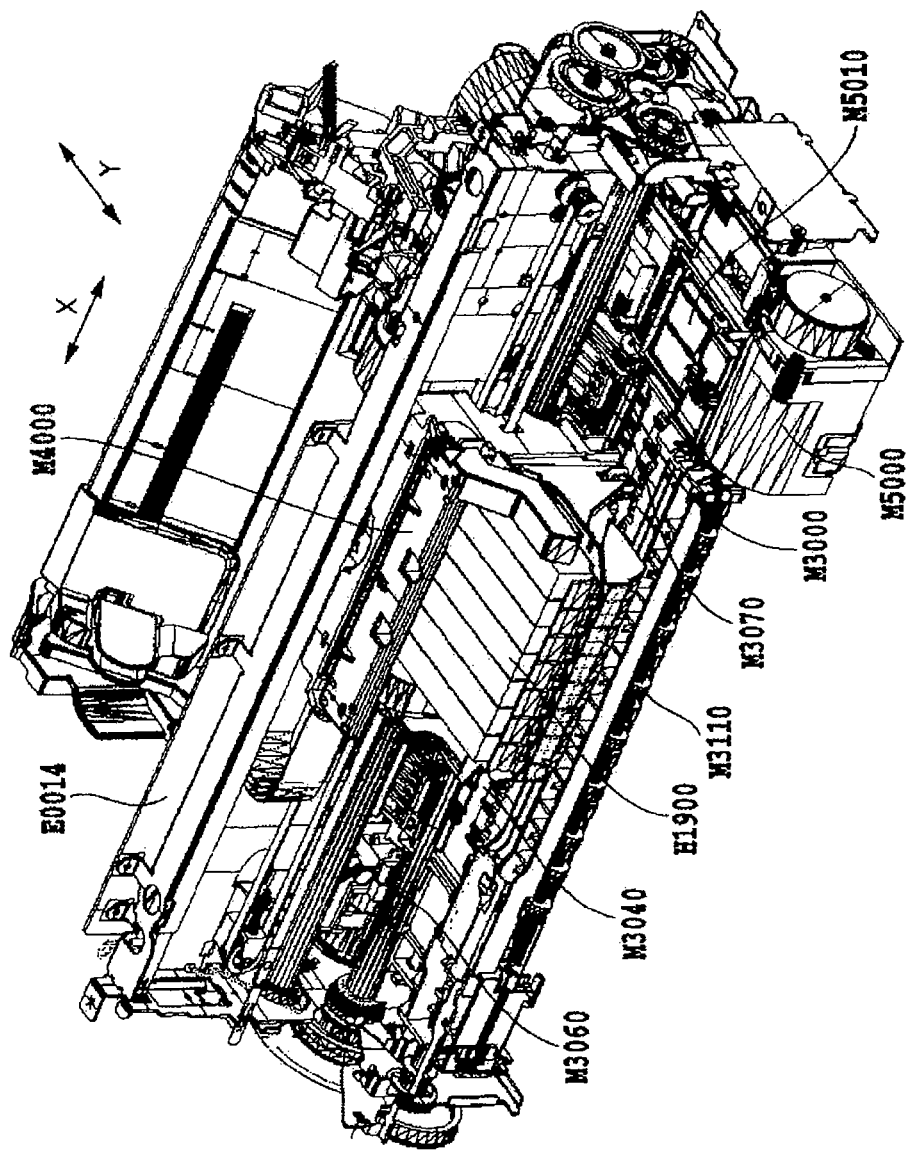
FIG. 3 is a perspective view of a mechanism portion of the recording apparatus.
Figure 4:
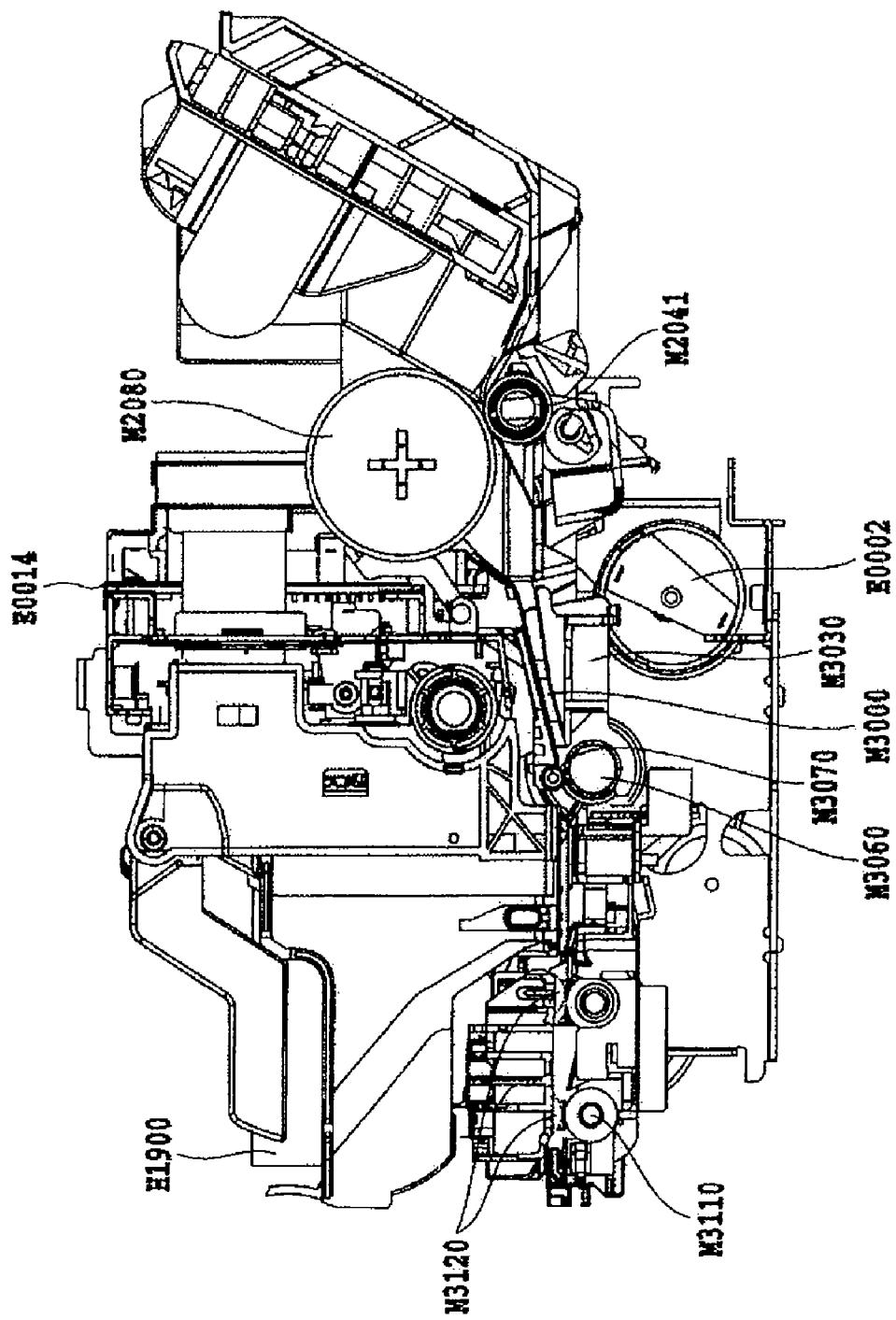
FIG. 4 is a sectional view of the recording apparatus.

FIG. 2 is a perspective view of a recording apparatus. FIGS. 3 and 4 are views for explaining the internal mechanism of a recording apparatus main body. FIG. 3 is a perspective view seen from an upper right portion, and FIG. 4 is a side sectional view of the recording apparatus main body.

When a sheet is to be fed in the recording apparatus, only a predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by the driving of an LF motor E0002, and the rotation causes the recording medium to be conveyed on a platen M3040.

In the carriage portion, when an image is to be formed on a recording medium, a recording head H1001 (FIG. 5) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in a column direction and sub scanning in which a recording medium is conveyed in a row direction by the conveying roller M3060 are alternately repeated, whereby an image is formed on the recording medium.

Finally, the recording medium on which an image has been formed is sandwiched at a nip between a first sheet discharge roller M3110 and a spur M3120 in the sheet discharge portion, conveyed, and discharged to a sheet discharge tray M3160.

In the cleaning portion, when a pump M5000 is allowed to act in a state where a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described. The head cartridge H1000 includes the recording head H1001, means for mounting ink tanks H1900, and means for supplying ink from the ink tanks H1900 to the recording head, and is detachably mounted on the carriage M4000.

Figure 5:
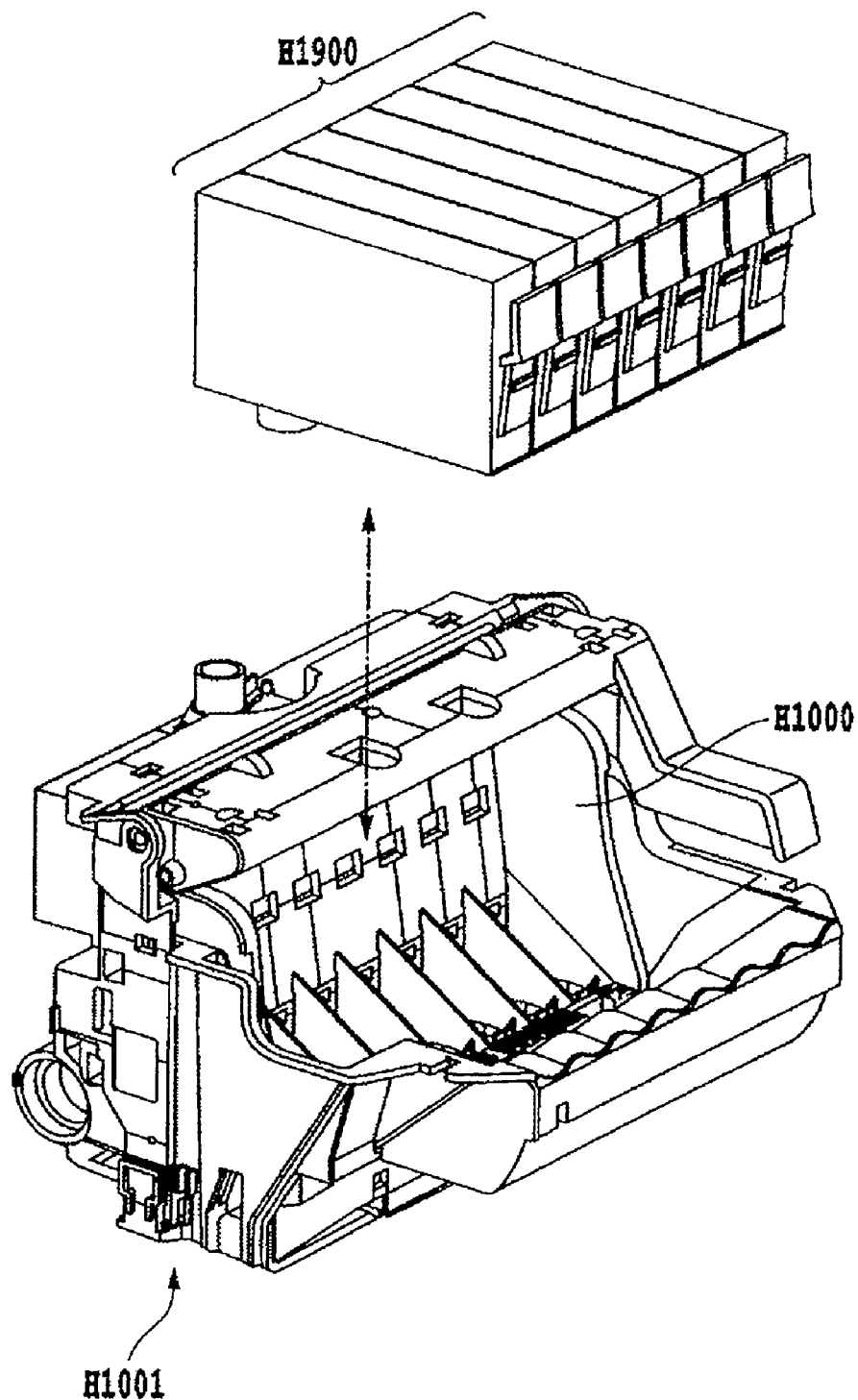
FIG. 5 is a perspective view showing a state where an ink tank is mounted on a head cartridge.

FIG. 5 shows how the ink tanks H1900 are mounted on the head cartridge H1000. The recording apparatus forms an image by means of yellow, magenta, cyan, black, pale magenta, pale cyan, and green inks, so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in a state where the head cartridge H1000 is mounted on the carriage M4000.

Figure 6:
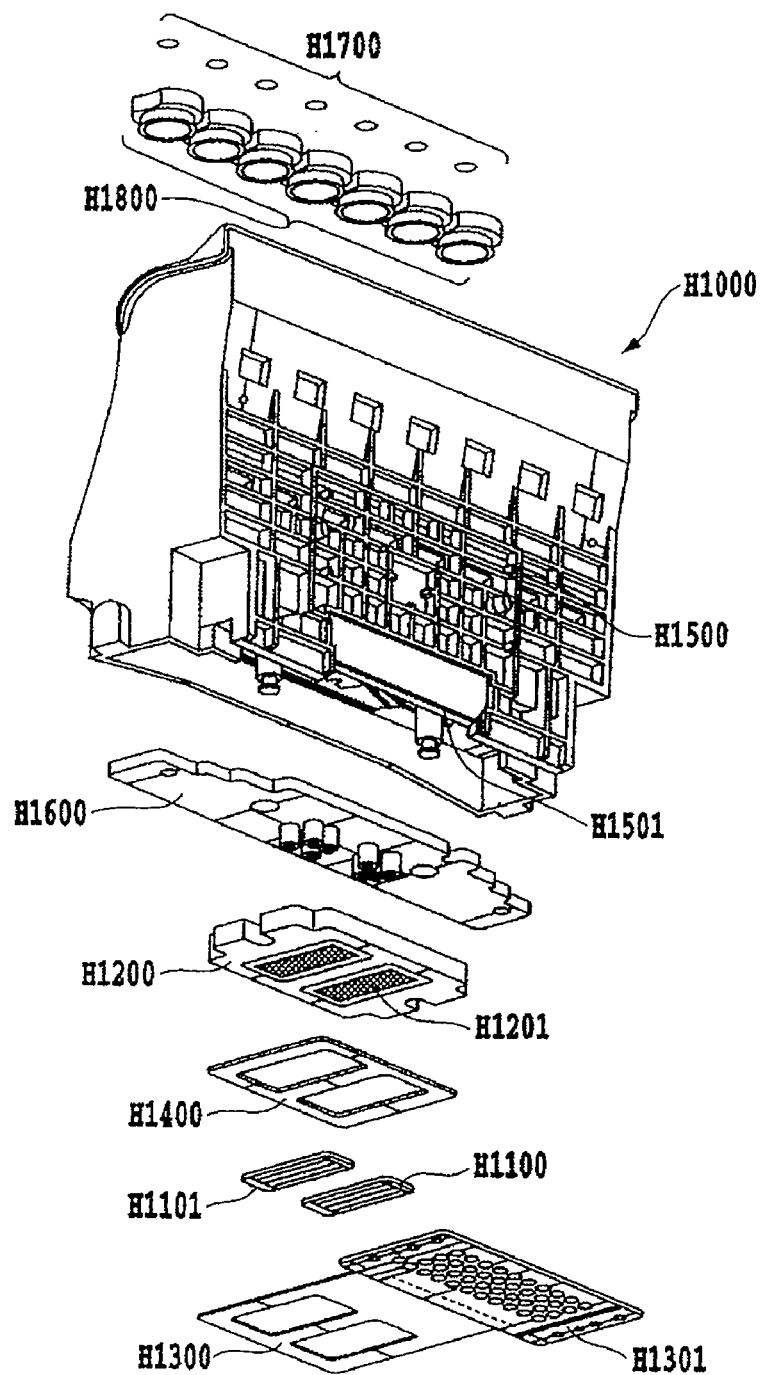
FIG. 6 is an exploded perspective view of the head cartridge.

FIG. 6 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is an Si substrate having multiple recording elements (nozzles) for ejecting ink formed on one surface by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 7:
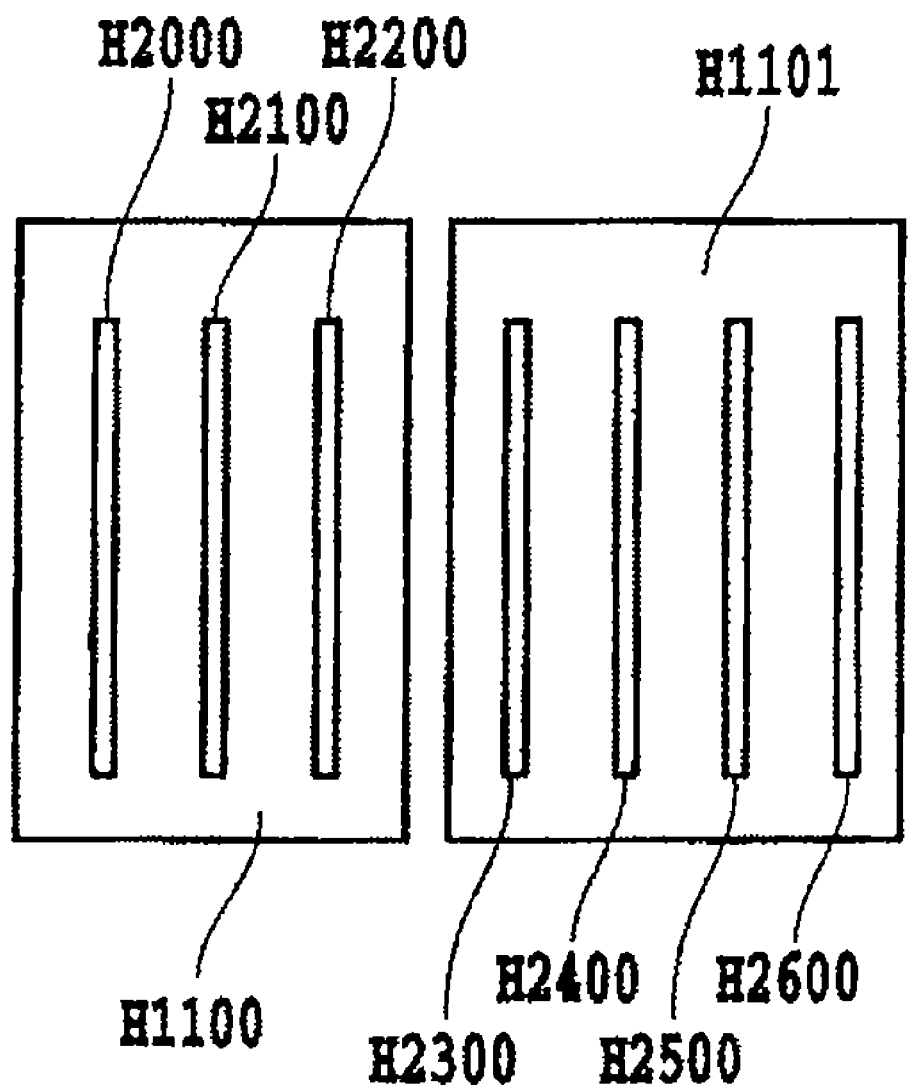
FIG. 7 is a front view showing a recording element substrate in the head cartridge.

FIG. 7 is an enlarged front view for explaining the constitution of each of the first recording element substrate H100 and the second recording element substrate H1101. Reference symbols H2000 to H2600 denote recording element trains (which may hereinafter be also referred to as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at an interval of 1,200 dpi (dot/inch; reference value) in the conveying direction of a recording medium, and each nozzle ejects about 2 pl of ink. An opening area in each nozzle ejection port is set to about 100 $\mu m^2$. The first recording element substrate H1100 and the second recording element substrate H1101 are bonded and fixed to the first plate H1200 having formed thereon ink supply ports H1201 for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the recording apparatus main body. The external signal input terminal H1301 is positioned and fixed to the back surface side of the tank holder H1500.

Meanwhile, the flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at an end portion on the ink tank side of the ink flow path H1501 engaged with the ink tanks H1900, so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is constituted by connecting through bonding or the like a tank holder portion constituted by: the tank holder H1500; the flow path forming member H1600; the filter H1700; and the seal rubber H1800, and the recording head portion H1001 constituted by: the first recording element substrate H1100; the second recording element substrate H1101; the first plate H1200; the electric wiring substrate H1300; and the second plate H1400.

Description has been made here by taking, as an example of an embodiment of a recording head, a recording head according to a bubble jet (registered trademark) method that performs recording by means of an electrothermal converter (recording element) that generates thermal energy for causing ink to generate film boiling in accordance with an electrical signal.

The representative structure and principle of a bubble jet method are preferably based on basic principles disclosed in, for example, U.S. Pat. Nos. 4,723,129 and 4,740,796. The method is applicable to any one of so-called an on-demand type and a continuous type. In particular, the method is effective for the on-demand type because of the following reason. At least one driving signal which corresponds to recording information and causes a sudden increase in temperature exceeding nuclear boiling is applied to an electrothermal converter arranged in correspondence with a sheet or liquid flow path holding a liquid (ink), to thereby cause the electrothermal converter to generate thermal energy. Then, a thermal action surface of a recording head is caused to generate film boiling. As a result, an air bubble in the liquid (ink) can be formed so as to be in one-to-one correspondence with the driving signal. The growth and contraction of the air bubble cause the liquid (ink) to be ejected through an opening for ejection, thereby forming at least one droplet. The driving signal is more preferably of a pulse shape because the growth and contraction of an air bubble can be performed immediately and appropriately, and hence the liquid (ink) can be ejected with particularly excellent responsiveness.

An example of a second embodiment of an ink jet recording apparatus utilizing mechanical energy includes an on-demand ink jet recording head including: a nozzle forming substrate having multiple nozzles; pressure generating means arranged so as to be opposed to the nozzles and composed of a piezoelectric material and a conductive material; and ink filling the surroundings of the pressure generating means, in which the pressure generating means is displaced through the application of a voltage to eject a small ink droplet from the nozzle.

The ink jet recording apparatus is not limited to such apparatus as described above in which a head and an ink tank are separated, and may be one in which a head and an ink tank are integrated so that they are unseparable. The ink tank may be separably or unseparably integrated with the head to be mounted on a carriage, or may be mounted at a fixing portion of an apparatus to supply ink to a recording head through an ink supply member such as a tube. When the ink tank is provided with a constitution for applying a preferable negative pressure to the recording head, an absorber may be arranged in an ink storage portion of the ink tank, or the ink tank may have a flexible ink storage bag and a spring portion for applying bias to expand the internal volume of the bag. The recording apparatus may adopt a serial recording method as described above, or may be in the form of a line printer obtained by aligning recording elements over the range corresponding to the entire width of a recording medium.

EXAMPLES

Hereinafter, the present invention will be described by way of examples and comparative examples. However, the present invention is not limited to the following examples without departing from the gist of the present invention. Unless otherwise stated, the term "part" of each ink component in examples and comparative examples represents "part by mass".

<Preparation of Coloring Material>

Diazotized 4-nitro-4'-aminostilbene-2,2-disulfonic acid and 3-aminonapthalene-1-sulfonic acid were subjected to coupling. The resultant was turned into a triazole, and a nitro group of the triazole was reduced to an amino group by means of a conventionally known method to produce aminostilbene-triazole. Aminostilbene-triazole was dissolved into water, and sodium nitrite and hydrochloric acid were added dropwise to the solution to perform diazotization. The resultant was added dropwise to an aqueous solution of a compound represented by Compound (1) below, and the whole was subjected to coupling, followed by dialysis with sodium chloride. The compound was diazotized with an aqueous solution of sodium nitrite, and was turned into a triazole by adding an aqueous solution of 6-aminonaphthalene-2-sulfonic acid. The triazole was dialyzed with sodium chloride to prepare a coloring material represented by Exemplified Compound 1 below.

Next, a clear ink was prepared by replacing the coloring material in the above composition with water.

Water has an evaporation rate X (mass %) of 100 mass %. Glycerin and urea used as water-soluble organic solvents in the above composition have evaporation rates X (mass %) of 0 mass % and 0.1 mass %, respectively. In addition, glycerin has a moisture absorptivity Y (mass %) of 66.9 mass % and urea has a moisture absorptivity Y (mass %) of 86.0 mass %. Therefore, each of glycerin and urea corresponds to a water-soluble organic solvent having an evaporation rate smaller than that of water and a moisture absorptivity of 20 mass % or more.

(Creation of Image for Evaluation and Calculation of Color Difference)

The model ink was changed in the duty range of 0% to 100% in an increment of 5% and the clear ink was changed in the duty range of 0% to 100% in an increment of 5% to create an image for evaluation having a superimposed gradation pattern. An ink jet printer (trade name: PIXUS 950i; manufactured by CANON Inc.) and a recording medium (trade name: SP-101; manufactured by CANON Inc.) were used for creating the image for evaluation. The resultant recorded article was left in an environment having a temperature of 25° C. and a humidity of 60% for 48 hours, and then the color tone of the superimposed gradation pattern portion was measured by means of a spectrophotometer (trade name: Spectrorino;

Compound (1)

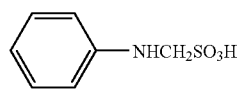

Exemplified Compound 1

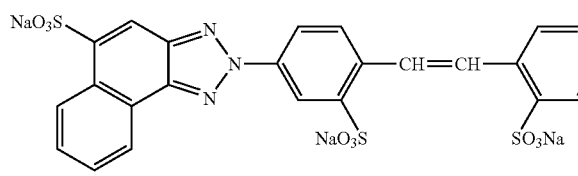

<Judgment of Properties of Coloring Material>

Properties (humidity resistance) of Exemplified Compound 1 thus prepared and the respective coloring materials shown in Table 5 below were judged by means of the method of judging properties of a coloring material of the present invention.

(Preparation of Model Ink and Clear Ink)

A model ink containing each coloring material was prepared according to the following prescription.

| | |
|---|---|
| Each coloring material | 3.0 parts |
| Glycerin | 9.0 parts |
| Urea | 9.0 parts |
| Acetylenol E100 (manufactured by Kawaken Fine Chemicals Co., Ltd.) | 1.0 part |
| Water | Balance | manufactured by Gretag Macbeth). The recorded article was additionally left in an environment having a temperature of 30° C. and a humidity of 80% for 168 hours, and then the color tone was measured in the same manner as that described above by means of the spectrophotometer as that described above. The color difference (ΔE) in the image for evaluation was calculated on the basis of the following expression (1) from the color tone of the image for evaluation after having been left in the environment having a temperature of 25° C. and a humidity of 60% for 48 hours and the color tone of the image for evaluation after having been left in the environment having a temperature of 30° C. and a humidity of 80% for 168 hours.

Values of La*b* in a CIE-La*b* color space of the image for evaluation after having been left in the environment having a temperature of 25° C. and a humidity of 60% for 48 hours (initial standard state)=$(L_1, a_1, b_1)$ Values of La*b* in the CIE-La*b* color space of the image for evaluation after having been left in the environment having a temperature of 30° C. and a humidity of 80% for 168 hours (after an acceleration test)=$(L_2, a_2, b_2)$ $$\Delta E = \sqrt{(L_1-L_2)^2+(a_1-a_2)^2+(b_1-b_2)^2} \quad (1)$$

The maximum color difference (ΔE) out of the color differences in the respective images for evaluation calculated on the basis of the expression (1) was calculated. Table 5 shows the results.

TABLE 5

| Coloring material | $\Delta E_{max}$ |
|---|---|
| Exemplified Compound 1 | 7.5 |
| C.I. Food Yellow 3 | 10.4 |

<Preparation of Ink>

Inks A to G of Examples and inks H to K of Comparative Examples were prepared by means of Exemplified Compound 1 thus prepared and C.I. Food Yellow 3 according to the prescription shown in Table 6.

TABLE 6

| | Ink | | | | | | | | | | |
|---|---|---|---|---|---|---|---|---|---|---|---|
| | A | B | C | D | E | F | G | H | I | J | K |
| Exemplified Compound 1 | 3.0 | 4.5 | 3.0 | 3.0 | 3.0 | 3.0 | 3.0 | 3.0 | 3.0 | | 3.0 |
| C.I. Food Yellow 3 | | | | | | | | | | 3.0 | |
| Ethylene glycol | | | | 4.0 | 11.2 | | | | | | |
| Diethylene glycol | 9.2 | 9.2 | 9.2 | 5.2 | | 5.0 | 9.2 | 9.2 | | 9.2 | 10.0 |
| 2-pyrrolidone | 5.0 | 5.0 | 5.0 | 2.0 | | 5.0 | 9.4 | 6.0 | | 5.0 | 5.0 |
| Ethylene urea | 5.0 | 5.0 | | 2.0 | 2.0 | | | | | 5.0 | |
| 1.5-pentanediol | | | 5.0 | | | | | | | | |
| N-methyl-2-pyrrolidone | | | | | | | | | 4.0 | | |
| Butyl carbitol | | | | | | | | | 2.0 | | |
| Isopropyl alcohol | | | | | | | | | 3.0 | | |
| Urea | | | | | | | | 9.0 | 5.0 | | 10.0 |
| Glycerin | 9.0 | 7.0 | 9.0 | 8.0 | 8.0 | 10.0 | 10.0 | 8.0 | 5.0 | 9.0 | 5.5 |
| Polyethylene glycol (*1) | | | | 5.0 | 5.0 | | | | | | |
| Acetylenol E100 (*2) | 0.9 | 0.9 | 0.9 | 0.9 | 0.9 | 0.9 | 0.9 | 0.9 | | 0.9 | 0.9 |
| Surfynol 104PG50 (*3) | | | | | | | | | 0.1 | | |
| Ion-exchanged water | 67.9 | 68.4 | 67.9 | 69.9 | 69.9 | 76.1 | 67.5 | 58.9 | 77.9 | 67.9 | 60.6 |

(*1) A molecular weight of 200
(*2) Ethylene oxide adduct of acetylene glycol (surfactant) (manufactured by Kawaken Fine Chemicals Co., Ltd.)
(*3) Surfactant; manufactured by Nissin Chemical Industry Co., Ltd.

<Printing Evaluation>

Clear inks A to K were prepared by replacing each of the coloring materials in the prescription of the inks A to G of Examples and the inks H to K of Comparative Examples thus obtained with pure water. An ink jet printer (trade name: PIXUS 950i; manufactured by CANON Inc.) was used for the evaluation.

(1) Humidity Resistance of Ink

Each of the inks of Examples and Comparative Examples was changed in the duty range of 0% to 100% in an increment of 5% and the corresponding clear ink was changed in the duty range of 0% to 100% in an increment of 5% to create an image for evaluation having a superimposed gradation pattern. The combination of the ink and the clear ink was the combination of the ink A and the clear ink A, the combination of the ink B and the clear ink B, or the like. A glossy recording medium (SP-101; manufactured by CANON Inc.) was used as a recording medium. The resultant recorded article was left in an environment having a temperature of 25° C. and a humidity of 60% for 48 hours, and then the color tone of the superimposed gradation pattern portion was measured by means of a spectrophotometer (trade name: Spectrorino; manufactured by Gretag Macbeth). The recorded article was additionally left in an environment having a temperature of 30° C. and a humidity of 80% for 168 hours, and then the color tone was measured in the same manner as that described above by means of the spectrophotometer as that described above. The color difference (ΔE) in each image for evaluation was calculated on the basis of the following expression (1) from the color tone of the image for evaluation after having been left in the environment having a temperature of 25° C. and a humidity of 60% for 48 hours and the color tone of the image for evaluation after having been left in the environment having a temperature of 30° C. and a humidity of 80% for 168 hours.

Values of La*b* in the CIE-La*b* color space of the image for evaluation after having been left in the environment having a temperature of 25° C. and a humidity of 60% for 48 hours (initial standard state)=$(L_1, a_1, b_1)$ Values of La*b* in the CIE-La*b* color space of the image for evaluation after having been left in the environment having a temperature of 30° C. and a humidity of 80% for 168 hours (after an acceleration test)=$(L_2, a_2, b_2)$ $$\Delta E = \sqrt{(L_1-L_2)^2+(a_1-a_2)^2+(b_1-b_2)^2} \quad (1)$$

The maximum color difference (ΔE) out of the color differences in the respective images for evaluation calculated on the basis of the expression (1) was calculated, and each ink was evaluated for humidity resistance on the basis of the following criteria. Table 7 shows the results.

A 4.0≧ΔE
B 5.5≧ΔE>4.0
C 7.0≧ΔE>5.5
D ΔE>7.0

(2) Start Up Ejection Stability

An ink jet printer on which an ink cartridge storing each of the inks of Examples and Comparative Examples had been mounted was left in an environment having a temperature of 15° C. and a humidity of 10% for 1 day. After that, printing was performed on high-quality dedicated paper (trade name: HR-101; manufactured by CANON Inc.) in the environment having a temperature of 15° C. and a humidity of 10% by means of the ink with a duty of 50%. Furthermore, printing was performed again in the same manner as that described above after a certain time interval from the above printing, and the time interval after which remarkable lack or dot mis-alignment occurred at an early stage of printing was measured. Start up ejection stability was evaluated by means of the measured time on the basis of the following criteria. Table 7 shows the results.

A An intermission of 5 seconds or longer
B An intermission of 3 seconds or longer and shorter than 5 seconds
C An intermission of shorter than 3 seconds

| Glycerin | 10 mass % |
|---|---|
| Urea | 10 mass % |
| Acetylenol E100 (manufactured by Kawaken Fine Chemicals Co., Ltd.) | 1.0 mass % |
| C.I. Direct Yellow 132 | 3.0 mass % |
| Water | Balance |

TABLE 7

| | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| Yellow Ink | A | B | C | D | E | F | G | H | I | J | K |
| X [mass %] (*4) | 28.2 | 26.2 | 28.2 | 26.2 | 26.2 | 20.0 | 28.6 | 32.2 | 19.0 | 28.2 | 30.5 |
| Y [mass %] (*5) | 19.2 | 19.2 | 19.2 | 13.2 | 13.2 | 10.0 | 18.6 | 15.2 | 9.0 | 19.2 | 15.0 |
| Z [%] (*6) | 68.1 | 73.3 | 68.1 | 50.4 | 50.4 | 50.0 | 65.0 | 47.2 | 47.4 | 68.1 | 49.2 |
| Humidity resistance | A | A | A | B | B | B | A | C | C | D | C |
| Intermittent ejection stability | A | B | B | A | B | B | B | A | A | A | B |

(*4) The total content of water-soluble organic solvents [mass %]
(*5) The content of a water-soluble organic solvent satisfying the expression (2) [mass %]
(*6) A ratio of the water-soluble organic solvent satisfying the expression (2) to the total content of the water-soluble organic solvents (%)

As can be seen from Table 7 above, when Examples 1 to 7 are compared with Comparative Examples 1, 2, and 4, excellent humidity resistance is obtained in the case where Exemplified Compound 1 having a color difference (ΔE) judged by means of the method of judging properties of a coloring material of 9 or less is used and the content of a water-soluble organic solvent satisfying the relationship represented by the expression (2) with respect to the total content of the water-soluble organic solvents in the ink is 50 mass % or more. When Examples 1, 2, 3, and 7 are compared with Examples 4, 5, and 6, additionally excellent humidity resistance is obtained in the case where the content of the water-soluble organic solvent satisfying the relationship represented by the expression (2) with respect to the total content of the water-soluble organic solvents in the ink is 65% or more. When Example 1 is compared with Example 3, humidity resistance and excellent start up ejection stability are obtained in the case where ethylene urea is incorporated as the water-soluble organic solvent satisfying the relationship represented by the expression (2). When Example 4 is compared with Example 5, humidity resistance and excellent start up ejection stability are obtained in the case where any one of diethylene glycol, 2-pyrrolidone, and ethylene urea is incorporated as the water-soluble organic solvent satisfying the relationship represented by the expression (2).

<Judgment of Humidity Resistance of Coloring Material>

The humidity resistance of each of various coloring materials was judged by means of the following method. Hereinafter, a specific example of a method of judging humidity resistance will be described.

(Preparation of Model Ink and Clear Ink)

To be specific, a model ink was prepared according to the following composition by using glycerin and urea as water-soluble organic solvents, Acetylenol E100 (manufactured by Kawaken Fine Chemicals Co., Ltd.) as a surfactant, and C.I. Direct Yellow 132 as a coloring material.

Next, separately from the model ink, a clear ink was prepared by replacing the coloring material portion of the model ink with water.

Water has an evaporation rate of 100%. Meanwhile, glycerin and urea used here as water-soluble organic solvents have evaporation rates X (mass %) of 0 mass % and 0.1 mass %, respectively. In addition, glycerin has a moisture absorptivity Y (mass %) of 66.9 mass % and urea has a moisture absorptivity Y (mass %) of 86.0 mass %. Therefore, each of glycerin and urea corresponds to a water-soluble organic solvent having an evaporation rate X (mass %) smaller than that of water and a moisture absorptivity Y (mass %) of 20 or more.

(Printing by Means of Model Ink and Clear Ink)

An ink jet printer (trade name: PIXUS 950i; manufactured by CANON Inc.) and a recording medium (trade name: SP-101; manufactured by CANON Inc.) were used for creating an image for evaluation. An image with a total duty of 80% in which the above model ink with a printing duty of 10% and the above clear ink with a printing duty of 70% were superimposed was printed in an environment having a temperature of 25° C. and a humidity of 60%.

(Leaving of Recorded Article)

The recorded article was left in the environment having a temperature of 25° C. and a humidity of 60% for 48 hours. After that, the CIE-Lab values of the image were measured by means of a spectrophotometer (trade name: Spectrolino; manufactured by Gretag Macbeth), and the values of Lab= $(L_1, a_1, b_1)$ in the CIE-La*b* color space in an initial standard state were determined. At that time, $L_1$=93.6, $a_1$=−7.5, and $b_1$=36.8.

After that, the recorded article was left in an environment having a temperature of 30° C. and a humidity of 80% for 168 hours, and then the CIE-Lab values of the image were measured by means of a spectrophotometer (trade name: Spectrolino; manufactured by Gretag Macbeth), and the values of Lab=$(L_2, A_2, B_2)$ in the CIE-La*b* color space in an initial standard state were determined. At that time, $L_2$=93.5, $a_2$=−9.6, and $b_2$=45.0. The results confirmed the following expression.

$$\Delta E = \sqrt{(L_1-L_2)^2+(a_1-a_2)^2+(b_1-b_2)^2} = 8.5$$

The color difference (ΔE) between any other coloring material before the leaving in the environment having a temperature of 30° C. and a humidity of 80% and the coloring material after the leaving in the same environment is as shown in Table 8 below.

TABLE 8

| Coloring material | Maximum value of ΔE obtained by means of a method of judging humidity resistance |
|---|---|
| Yellow coloring material Y1 | 7.5 |
| Direct Yellow 132 | 8.5 |
| Direct Yellow 142 | 8.0 |
| Direct Yellow 86 | 5.0 |
| Direct Yellow 173 | 4.8 |
| Acid Yellow 23 | 9.7 |

<Preparation of Ink>

Inks L to U of Examples and inks V to Y of Comparative Examples were prepared by means of Exemplified Compound 1 thus prepared and the respective coloring materials, according to the prescription shown in Table 9.

<Printing Evaluation>

Clear inks L to Y were prepared by replacing each of the coloring materials in the prescription of the inks L to U of Examples and the inks V to Y of Comparative Examples thus obtained with pure water. An ink jet printer (trade name: PIXUS 950i; manufactured by CANON Inc.) was used for the evaluation.

(1) Humidity Resistance of Ink

Each of the inks of Examples and Comparative Examples was changed in the duty range of 0% to 100% in an increment of 5% and the corresponding clear ink was changed in the duty range of 0% to 100% in an increment of 5% to create an image for evaluation having a superimposed gradation pattern. The combination of the ink and the clear ink was the combination of the ink L and the clear ink L, the combination of the ink M and the clear ink M, or the like. A glossy recording medium (SP-101; manufactured by CANON Inc.) was used as a recording medium. The resultant recorded article was left in an environment having a temperature of 25° C. and a humidity of 60% for 48 hours, and then the color tone of the superimposed gradation pattern portion was measured by means of a spectrophotometer (trade name: Spectrorino; manufactured by Gretag Macbeth). The recorded article was additionally left in an environment having a temperature of 30° C. and a humidity of 80% for 168 hours, and then the color tone was measured in the same manner as that described above by means of the spectrophotometer as that described

TABLE 9

| | Ink | | | | | | | | | | | | | |
|---|---|---|---|---|---|---|---|---|---|---|---|---|---|---|
| | L | M | N | O | P | Q | R | S | T | U | V | W | X | Y |
| Exemplified Compound 1 | 0.5 | 1.0 | 0.5 | 0.5 | 0.5 | 0.5 | 0.5 | 0.5 | 0.5 | 3.0 | 0.5 | 0.5 | 0.5 | 0.5 |
| C.I. Direct Yellow 132 | 2.5 | 3.0 | 2.5 | 2.5 | 2.5 | 2.5 | 2.5 | | | | 2.5 | 2.5 | | 2.5 |
| C.I. Direct Yellow 142 | | | | | | | | 3.0 | | | | | | |
| C.I. Direct Yellow 86 | | | | | | | | | 3.0 | | | | | |
| C.I. Direct Yellow 173 | | | | | | | | | | 0.5 | | | | |
| C.I. Acid Yellow 23 | | | | | | | | | | | | | 2.5 | |
| Ethylene glycol | | | | 4.2 | 11.2 | | | | | | 3.0 | | | 10.0 |
| Diethylene glycol | 9.2 | 9.2 | 9.2 | 5.0 | | 5.0 | 9.2 | 9.2 | 9.2 | 9.2 | | | 9.2 | |
| 2-pyrrolidone | 5.0 | 5.0 | 5.0 | 2.0 | | 5.0 | 9.4 | 5.0 | 5.0 | 5.0 | 5.0 | | 5.0 | 5.0 |
| Ethylene urea | 5.0 | 5.0 | | 3.0 | 3.0 | | | 5.0 | 5.0 | 5.0 | | | 5.0 | |
| 1,5-pentanediol | | | 5.0 | | | | | | | | | | | |
| N-methyl-2-pyrrolidone | | | | | | | | | | | | 4.0 | | |
| Butyl carbitol | | | | | | | | | | | | 2.0 | | |
| Isopropyl alcohol | | | | | | | | | | | | 3.0 | | |
| Urea | | | | | | | | | | | 5.0 | 10.0 | 5.0 | 10.0 |
| Glycerin | 9.0 | 7.0 | 9.0 | 12.0 | 12.0 | 10.0 | 10.0 | 9.0 | 9.0 | 9.0 | 13.0 | 5.0 | 9.0 | 5.5 |
| Polyethylene glycol (*1) | | | | | | | | | | | | | | |
| Surfynol 104PG50 (*3) | | | | | | | | | | | | 0.1 | | |
| Ion-exchanged water | 67.9 | 68.9 | 67.9 | 69.9 | 69.9 | 76.1 | 67.5 | 67.4 | 67.4 | 62.4 | 65.1 | 77.9 | 67.9 | 65.6 |

(*2) Ethylene oxide adduct of acetylene glycol (surfactant)

(*3) (Surfactant; manufactured by Nissin Chemical Industry Co., Ltd.)

above. The color difference (ΔE) in each image for evaluation was calculated on the basis of the following expression (1) from the color tone of the image for evaluation after having been left in the environment having a temperature of 25° C. and a humidity of 60% for 48 hours and the color tone of the image for evaluation after having been left in the environment having a temperature of 30° C. and a humidity of 80% for 168 hours.

Values of La*b* in the CIE-La*b* color space of the image for evaluation after having been left in the environment having a temperature of 25° C. and a humidity of 60% for 48 hours (initial standard state)=($L_1$, $a_1$, $b_1$)

Values of La*b* in the CIE-La*b* color space of the image for evaluation after having been left in the environment having a temperature of 30° C. and a humidity of 80% for 168 hours (after an acceleration test)=($L_2$, $a_2$, $b_2$)

$$\Delta E = \sqrt{(L_1-L_2)^2+(a_1-a_2)^2+(b_1-b_2)^2} \quad (1)$$

The maximum color difference (ΔE) out of the color differences in the respective images for evaluation calculated on the basis of the expression (1) was calculated, and each ink was evaluated for humidity resistance on the basis of the following criteria. Table 9 shows the results.

A $4.0 \geq \Delta E$
B $5.5 \geq \Delta E > 4.0$
C $7.0 \geq \Delta E > 5.5$
D $\Delta E > 7.0$ (2) Start Up Ejection Stability An ink jet printer on which an ink cartridge storing each of the inks of Examples and Comparative Examples had been mounted was left in an environment having a temperature of 15° C. and a humidity of 10% for 1 day. After that, printing was performed on high-quality dedicated paper (HR-101; manufactured by CANON Inc.) in the environment having a temperature of 15° C. and a humidity of 10% by means of the ink with a duty of 50%. Furthermore, printing was performed again in the same manner as that described above after a certain time interval from the above printing, and the time interval after which remarkable lack or dot mis-alignment occurred at an early stage of printing was measured. Start up ejection stability was evaluated by means of the measured time on the basis of the following criteria. Table 9 shows the results.

A An intermission of 5 seconds or longer
B An intermission of 3 seconds or longer and shorter than 5 seconds
C An intermission of shorter than 3 seconds (3) Image Density Each of the inks of Examples and Comparative Examples was used to perform printing with a duty of 100%, to thereby produce a recorded article. A glossy recording medium (SP-101; manufactured by CANON Inc.) was used as a recording medium. The resultant recorded article was naturally dried for 24 hours. The optical density of a printed portion was measured by means of a spectrophotometer (trade name: Spectrolino; manufactured by Gretag Macbeth), and an image density was evaluated on the basis of the following criteria. Table 9 shows the results.

A An optical density of larger than 1.85
B An optical density of 1.75 or more and 1.85 or less
C An optical density of smaller than 1.75

(4) Color Tone

Each of the inks of Examples and Comparative Examples was used to perform printing with a duty of 100%, to thereby produce a recorded article. A glossy recording medium (PR-101; manufactured by CANON Inc.) was used as a recording medium. The resultant recorded article was naturally dried for 24 hours. The chroma (C) and hue angle (h) of a printed portion were measured by means of a spectrophotometer (trade name: Spectrolino; manufactured by Gretag Macbeth). The chroma (C) was calculated on the basis of the following expression (3) from the values of a*b* in the CIE-La*b* color space. The chroma and the hue angle were evaluated on the basis of the following criteria. Table 10 shows the results.

$$C = \sqrt{a^2+b^2} \quad (3)$$

Chroma (C)
A C of 105 or more
B C of 95 or more and less than 105

Hue angle (h)
A h is 85 or more and less than 90.
B h is 83 or more and 85 or less, or is 90 or more and 92 or less.
C h is less than 83, or is larger than 92.

TABLE 10

| | Example | | | | | | | | | | Comparative Example | | | |
|---|---|---|---|---|---|---|---|---|---|---|---|---|---|---|
| | 8 | 9 | 10 | 11 | 12 | 13 | 14 | 15 | 16 | 17 | 5 | 6 | 7 | 8 |
| Ink | L | M | N | O | P | Q | R | S | T | U | V | W | X | Y |
| X [mass %] (*4) | 28.2 | 26.2 | 28.2 | 26.2 | 26.2 | 20.0 | 28.6 | 28.2 | 28.2 | 33.2 | 31.0 | 19.0 | 28.2 | 30.5 |
| Y [mass %] (*5) | 19.2 | 19.2 | 19.2 | 14.2 | 14.2 | 10.0 | 18.6 | 19.2 | 19.2 | 19.2 | 8.0 | 9.0 | 19.2 | 15.0 |
| Z [%] (*6) | 68.1 | 73.3 | 68.1 | 54.2 | 54.2 | 50.0 | 65.0 | 68.1 | 68.1 | 57.8 | 25.8 | 47.4 | 68.1 | 49.2 |
| Humidity resistance | A | A | A | B | B | B | A | B | A | B | D | C | C | C |
| Intermittent ejection stability | A | B | B | A | B | B | B | B | B | B | A | A | B | B |
| Image density | A | A | A | A | A | A | A | B | A | B | A | A | C | A |
| Chroma (C) | A | A | A | A | A | A | A | A | A | B | A | A | A | A |
| Hue angle (h) | A | A | A | A | A | A | A | B | C | B | A | A | B | A |

(*4) The total content of water-soluble organic solvents [mass %]

(*5) The content of a water-soluble organic solvent satisfying the expression (2) [mass %]

(*6) A ratio of the water-soluble organic solvent satisfying the expression (2) to the total content of the water-soluble organic solvents [%]

As can be seen from Table 10 above, when Examples 8 to 17 are compared with Comparative Examples 5, 6, and 8, excellent humidity resistance is obtained in the case where the content of a water-soluble organic solvent satisfying the relationship represented by the expression (2) with respect to the total content of the water-soluble organic solvents in the ink is 50 mass % or more. When Examples 8, 9, 10, and 14, and Examples 11, 12, and 13, which involve the use of the same coloring material, are compared, additionally excellent humidity resistance is obtained in the case where the content of the water-soluble organic solvent satisfying the relationship represented by the expression (2) with respect to the total content of the water-soluble organic solvents in the ink is 65% or more. When Examples 8 to 14 are compared with Examples 15 to 17, with regard to an image density and a color tone, excellent humidity resistance, excellent start up ejection stability, an excellent image density, and an excellent color tone are obtained by using Exemplified Compound 1 and C.I. Direct Yellow 132 in combination. When Example 8 is compared with Example 10, humidity resistance and excellent start up ejection stability are obtained in the case where ethylene urea is incorporated as the water-soluble organic solvent satisfying the relationship represented by the expression (2). When Example 11 is compared with Example 12, humidity resistance and excellent start up ejection stability are obtained in the case where any one of diethylene glycol, 2-pyrrolidone, and ethylene urea is incorporated as the water-soluble organic solvent satisfying the relationship represented by the expression (2).

The present application claims the priority from each of Japanese Patent Application No. 2004-196446 filed on Jul. 2, 2004, Japanese Patent Application No. 2004-196449 filed on Jul. 2, 2004, and Japanese Patent Application No. 2005-193806 filed on Jul. 1, 2005, the contents of which are cited to constitute part of the present application.

What is claimed is:

1. An ink jet ink comprising:
a coloring material; and
a water-soluble organic solvent,
wherein the coloring material comprises (a) a compound represented by the following general formula (I) or a salt thereof and (b) C.I. Direct Yellow 132,
wherein the mass ratio of the content of the compound represented by the general formula (I) or a salt thereof to the content of the C.I. Direct Yellow 132 is in the range of 0.5:5 to 2:5,
wherein the content of the coloring material is 1.0 mass % or more and 4.0 mass % or less with respect to the total mass of the ink,
wherein the water-soluble organic solvent comprises (a) diethylene glycol, 2-pyrrolidone, and ethylene urea as group A solvents, and (b) glycerin as a group B solvent,
wherein the total content of the water-soluble organic solvent is 10 mass % or more and 50 mass % or less with respect to the total mass of the ink, and
wherein the total content of the group A solvents is 50 mass % or more and 73.3 mass % or less with respect to the total content of the water-soluble organic solvent in the ink:

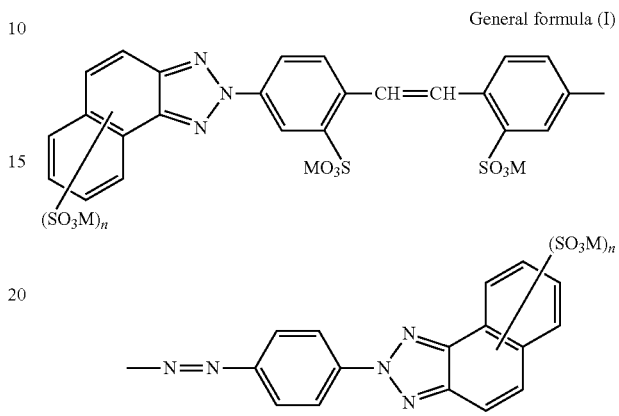

where "M"s each independently represent a hydrogen atom, an alkali metal, an alkali earth metal, a cation of organic amine or an ammonium ion, and "n"s each independently represent 1 or 2.

2. An ink jet ink according to claim 1, wherein the total content of the group A solvents is 65 mass % or more with respect to the total content of the water-soluble organic solvent in the ink.

3. An ink jet recording method comprising:
ejecting an ink by ink jet method,
wherein the ink comprises the ink jet ink according to claim 1.

4. An ink cartridge comprising:
an ink storage portion for storing ink,
wherein the ink comprises the ink jet ink according to claim 1.

5. A recording unit comprising:
an ink storage portion for storing ink; and
a recording head for ejecting the ink,
wherein the ink comprises the ink jet ink according to claim 1.

6. An ink jet recording apparatus comprising:
an ink storage portion for storing ink; and
a recording head for ejecting the ink,
wherein the ink comprises the ink jet ink according to claim 1.

7. An ink jet ink according to claim 1, wherein the compound represented by the general formula (I) is the following Exemplified Compound 1:

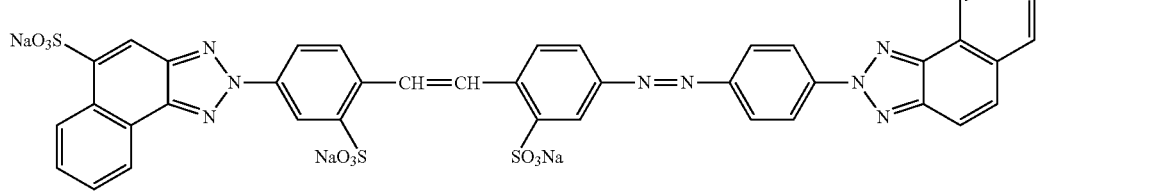

8. An ink jet ink according to claim 7, wherein the total content of the group A solvents is 65 mass % or more with respect to the total content of the water-soluble organic solvent in the ink.

9. An ink jet ink according to claim 7, wherein the content of the compound represented by the general formula (I) or a salt thereof is 10 mass % or more with respect to the total content of all coloring material in the ink, wherein the content of C.I. Direct Yellow 132 is 10 mass % or more with respect to the total content of all coloring material in the ink, and wherein the total content of the group A solvents is 65 mass % or more with respect to the total content of the water-soluble organic solvent in the ink.

10. An ink jet ink according to claim 9, further comprising water.

11. An ink jet ink according to claim 10, wherein for the ink, a color difference $\Delta E$ is 4 or less, wherein the color difference $\Delta E$ is judged by means of a method including the following steps (1) to (3):

(1) a step involving: applying the ink as a model ink; and applying a clear ink, prepared by replacing only the coloring material of the model ink with water, on the model ink in such a manner that an amount of the model ink is smaller than that of the clear ink;

(2) a step involving: leaving a recorded article obtained in the step (1) in an environment having a temperature of 25° C. and a humidity of 60% for 48 hours; and subsequently leaving the recorded article in an environment having a temperature of 30° C. and a humidity of 80% for 168 hours; and (3) a step of judging the color difference ($\Delta E$) represented by the following expression (1), $$\Delta E = \sqrt{(L_1-L_2)^2+(a_1-a_2)^2+(b_1-b_2)^2} \tag{1}$$

wherein in the expression (1), $L_1$, $a_1$, and $b_1$ represent L, a, and b of an Lab colorimetric system as measured by a spectrophotometer after the leaving for 48 hours and before the leaving for 168 hours, respectively, and $L_2$, $a_2$, and $b_2$ represent L, a, and b of the Lab colorimetric system as measured by a spectrophotometer after the leaving for 168 hours, respectively.

* * * * *